US010699058B2

(12) United States Patent
Arora et al.

(10) Patent No.: US 10,699,058 B2
(45) Date of Patent: Jun. 30, 2020

(54) DIGITAL CONTENT DESIGN SYSTEM USING BASELINE UNITS TO CONTROL ARRANGEMENT AND SIZING OF DIGITAL CONTENT

(71) Applicant: Adobe Inc., San Jose, CA (US)

(72) Inventors: Aman Arora, New Delhi (IN); Rohit Kumar Dubey, Chittorgarh (IN); Anurag Singh, Noida (IN)

(73) Assignee: Adobe Inc., San Jose, CA (US)

( * ) Notice: Subject to any disclaimer, the term of this patent is extended or adjusted under 35 U.S.C. 154(b) by 89 days.

(21) Appl. No.: 15/976,527

(22) Filed: May 10, 2018

(65) Prior Publication Data

US 2019/0347311 A1 Nov. 14, 2019

(51) Int. Cl.
*G06F 17/00* (2019.01)
*G06F 40/106* (2020.01)
*G06F 3/0484* (2013.01)
*G06F 40/109* (2020.01)
*G06F 40/166* (2020.01)

(52) U.S. Cl.
CPC .......... *G06F 40/106* (2020.01); *G06F 3/0484* (2013.01); *G06F 40/109* (2020.01); *G06F 40/166* (2020.01)

(58) Field of Classification Search
CPC .................................................. G06F 17/211
See application file for complete search history.

(56) References Cited

U.S. PATENT DOCUMENTS

| 5,263,132 | A  | * | 11/1993 | Parker | G06F 17/211 715/207 |
| 5,416,898 | A  | * | 5/1995 | Opstad | G06F 17/214 345/468 |
| 5,892,842 | A  | * | 4/1999 | Bloomberg | G06K 9/32 382/173 |
| 7,120,872 | B2 | * | 10/2006 | Thacker | G06F 3/0481 715/209 |
| 8,515,176 | B1 | * | 8/2013 | Sankaranarayanan | G06K 9/00463 382/185 |
| 8,566,707 | B1 | * | 10/2013 | Shagam | G06T 11/60 715/204 |
| 2005/0172224 | A1 | * | 8/2005 | Kobashi | G06F 17/212 715/244 |

(Continued)

OTHER PUBLICATIONS

Furuta et al., "Document Formatting Systems: Survey, Concepts, and Issues," Computing Surveys, vol. 14, No. 3, Sep. 1982, p. 417-472. (Year: 1982).*

*Primary Examiner* — Amelia L Tapp
(74) *Attorney, Agent, or Firm* — SBMC

(57) ABSTRACT

Digital content design system techniques are described using baseline units to control arrangement and sizing of digital content. In one example, a digital content design system receives a user input specifying a number of baselines to be included within an available display area of a page. Baselines are used to align digital content to control arrangement of the digital content within the page, e.g., text. From this, the digital content design system then calculates a baseline unit from a distance used to space adjacent baselines of the number of baselines from each other. This baseline unit is then leveraged by the system as a fundamental unit of measure to control arrangement and/or sizing of digital content in relation to each other.

20 Claims, 28 Drawing Sheets

(56) References Cited

U.S. PATENT DOCUMENTS

2007/0133842 A1\* 6/2007 Harrington ........ G06K 9/00463
 382/112
2014/0372874 A1\* 12/2014 Marseille .............. G06F 17/243
 715/243

\* cited by examiner

*DrawBaseline:*

*Calculate page_height = height of page*

*If relative_to is equal top_of_page:*

*effective_height = page_height – start_from*

*if relative_to is equal top_margin:*

*effective_height = page_height – (start_from + top_margin + bottom_margin)*

*baseline_distance = effective_height / no_of_baseline*

*Draw baselines at baseline_distance.*

*DrawBaseline function update baseline_distance dynamically, if user changes size of page.*

*Fig. 5*

```
SetBaselineAsFundamentalUnit:
  baseline_unit_distance = get baseline_distance from DrawBaseline
  set baseline_unit_distance as fundamental unit
  Add this unit everywhere in the application
  Effective position is then determined as Number of Baselines specified as units*
    baseline_unit_distance
```

Fig. 6

```
DistributeDocumentGrid:
    if distribute_document_grid is equal Custom ratio:
        horizontal_gridline_every = custom provided
        vertical_gridline_every = custom provided
    else if distribute_document_grid is equal Square ratio:
        horizontal_gridline_every = baseline_distance
        vertical_gridline_every = baseline_distance
    else if distribute_document_grid is equal Golden ratio:
        horizontal_gridline_every = baseline_distance / golden_ratio
        vertical_gridline_every = baseline_distance
    else if distribute_document_grid is equal Page ratio:
        Calculate page_height = height of page
        Calculate page_width = width of page
        page_ratio = page_height / page_width
        horizontal_gridline_every = baseline_distance / page_ratio
        vertical_gridline_every = baseline_distance
    Draw horizontal document grid at horizontal_gridline_every.
    Draw vertical document grid at vertical_gridline_every.
```

Fig. 8

Font size set to 2 baseline units.
Sample text to follow...
Omni comnistio. Raessimos nimperc hilland estecusam, et quid mos es non pro voloreptat porem lam autai.

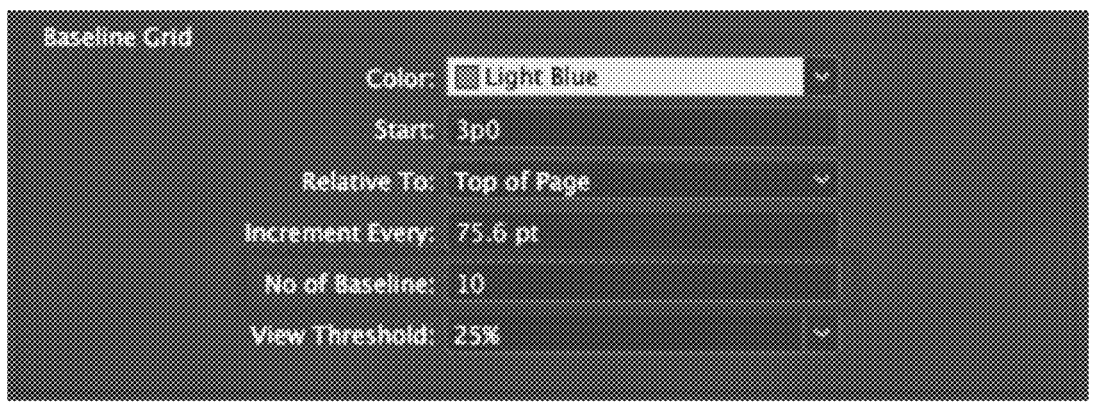
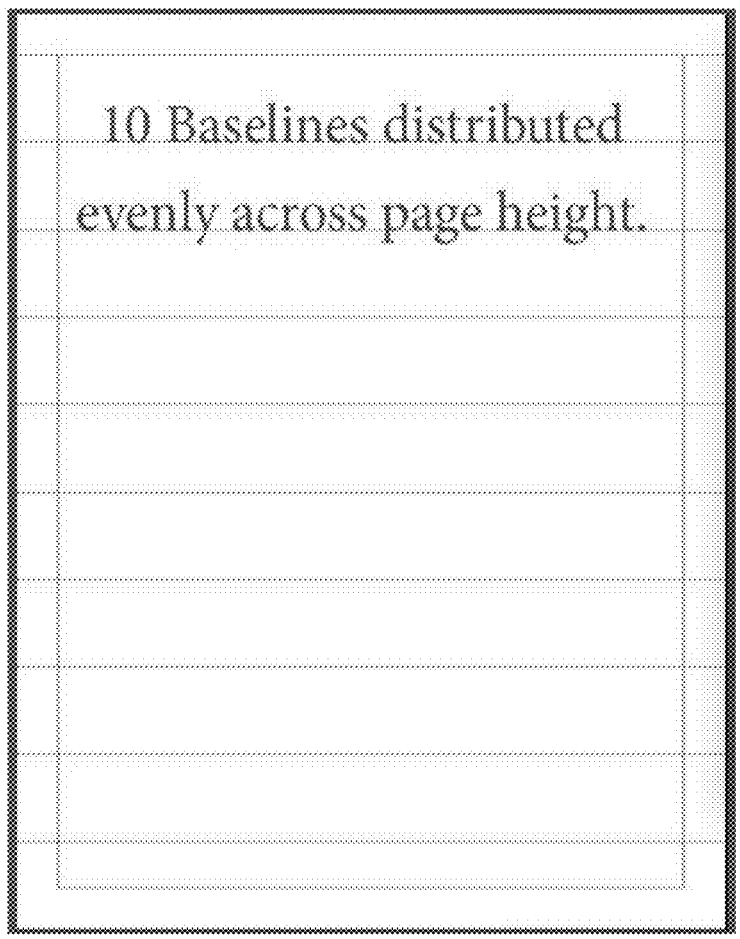
Fig. 16

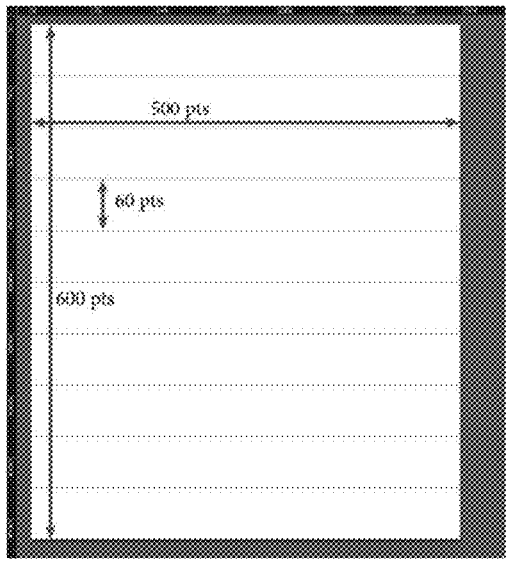
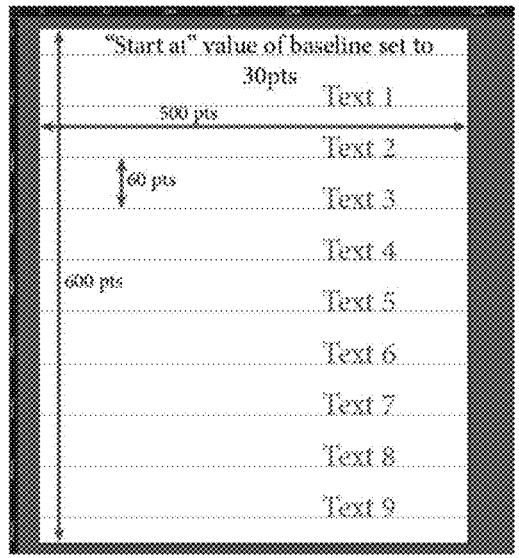
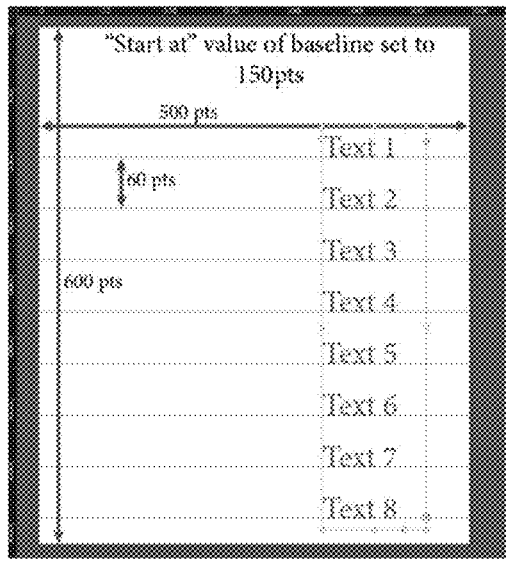
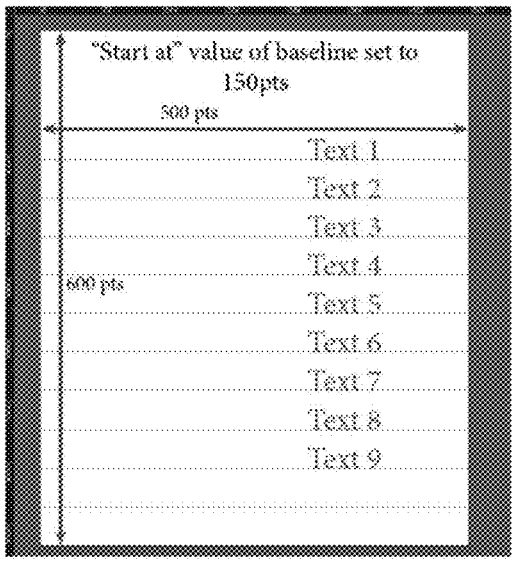
Fig. 22

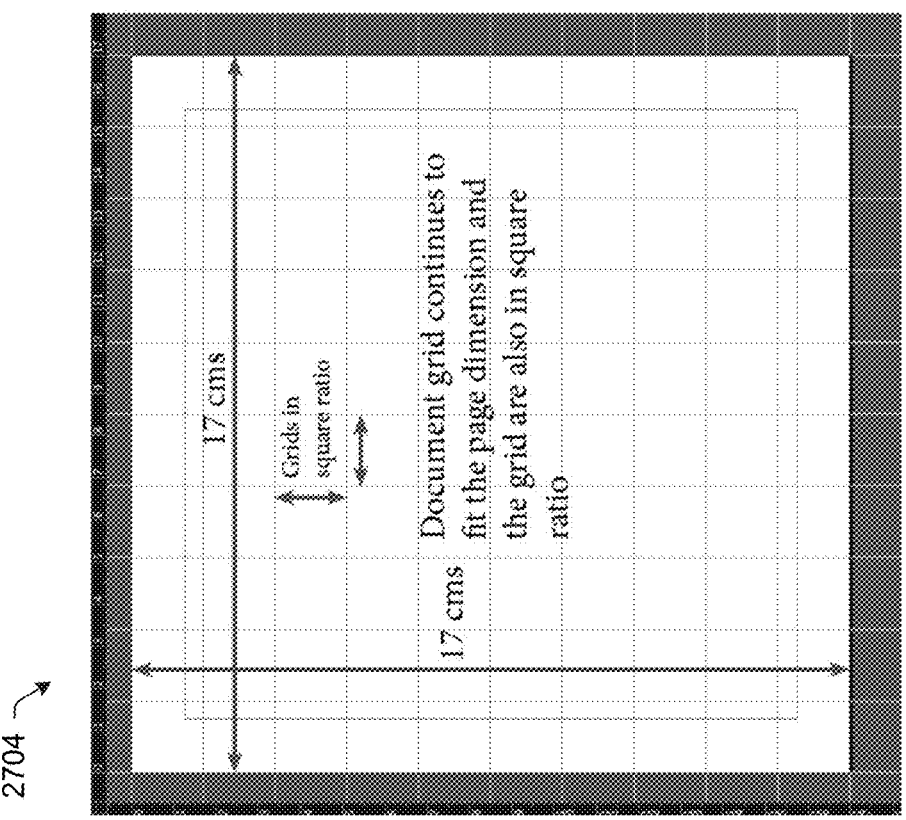
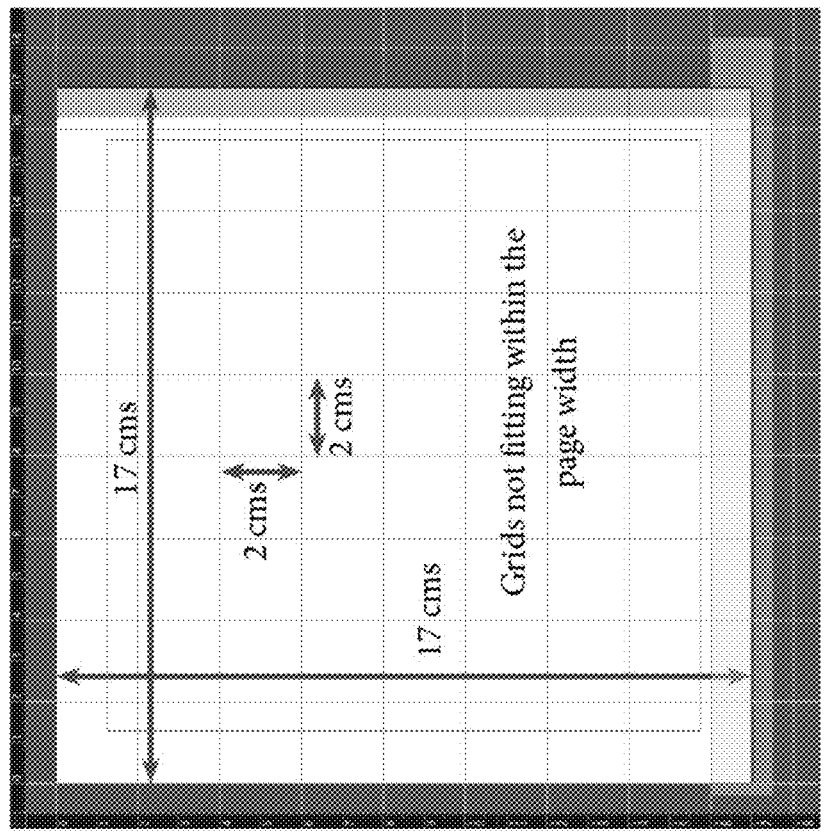
Fig. 27

DIGITAL CONTENT DESIGN SYSTEM USING BASELINE UNITS TO CONTROL ARRANGEMENT AND SIZING OF DIGITAL CONTENT

BACKGROUND

Digital layout creation systems are typically employed to create layouts for digital content designs to achieve a desired output in how digital content within the design is arranged with respect to each other. In order to guide creation of the digital content design, the digital layout creation system may employ a baseline grid that is configured to define spacing and arrangement of items of digital content within the digital content design in relation to each other. The baseline grid, for instance, may be configured to provide a visual guide that is usable to guide placement and sizing of items of digital content in relation to each other.

Conventional baseline grids, however, are defined based on units of measure that are independent from a page that includes the baseline grid. Therefore, display characteristics of the digital content design are separated from a page that is to leverage the design. In one conventional example, display characteristics that include line spacing, font size, and spacing before and after paragraphs are defined using a number of points, e.g., in which each point corresponds to 1.3 pixels. Likewise, display characteristics such as margins and indents are defined using standardized units of measure, e.g., using inches or centimeters.

Therefore, these conventional systems require significant amounts of manual calculations by a creative professional in order to determine correspondence of each of these display characteristics with respect to a page. For example, it may take a significant amount of calculation to determine how many points are required between each horizontal line in the baseline grid to evenly space these lines within an available display area within the page for a desired number of lines. This is further complicated by any subsequent changes that may be made to available display area within the page (e.g., to change the page's margins), which may therefore require the creative professional to manually recompute these display characteristics. This also results in inefficient use of computational resources of a computing device that employs these techniques that may be caused by errors in the manual computations and by the creative professional to change the display characteristics. Accordingly, conventional techniques used to create digital content designs are inefficient both with respect to a creative professional that is tasked with creating the digital content design as well as in use of computational resources of a computing device to assist in creating the digital content design.

SUMMARY

Digital content design system techniques are described using baseline units to control arrangement and sizing of digital content. In one example, a digital content design system receives a user input specifying a number of baselines to be included within an available display area of a page. Baselines are used to align digital content to control arrangement of the digital content within the page, e.g., text.

From this, the digital content design system then calculates a baseline unit from a distance used to space adjacent baselines of the number of baselines from each other. This baseline unit is then leveraged by the system as a fundamental unit of measure to control arrangement and/or sizing of digital content in relation to each other. A user input, for instance, may be received to set an amount of spacing before or after a paragraph, an amount of leading, indent, margins, baseline shift, a document grid, ruler guides, and so on as units of the baseline grid. In this way, the display characteristics may be tied to an actual page used to display the digital content, which is not possible using conventional techniques that are based on standardized units of measure that are independent of the page.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIG. 5 depicts a technique to determine spacing and placement of baselines within an available content display area of a page.

FIG. 6 depicts a technique to set a baseline unit as a fundamental unit to control display characteristics of a page.

FIG. 8 depicts a techniques to distribute lines a document grid that includes baselines.

FIG. 16 depicts an example implementation showing use of a baseline unit as preventing unequal spacing left at a top or bottom edge of a page while setting up a baseline grid.

FIG. 22 depicts an example implementation in which placement of an initial baseline within a baseline grid is shown.

FIG. 27 depicts an example implementation in which a document grid is adjusted automatically and without user intervention by the layout system in response to changes in size of an available content display area of a page.

DETAILED DESCRIPTION

Overview

Figure 1:
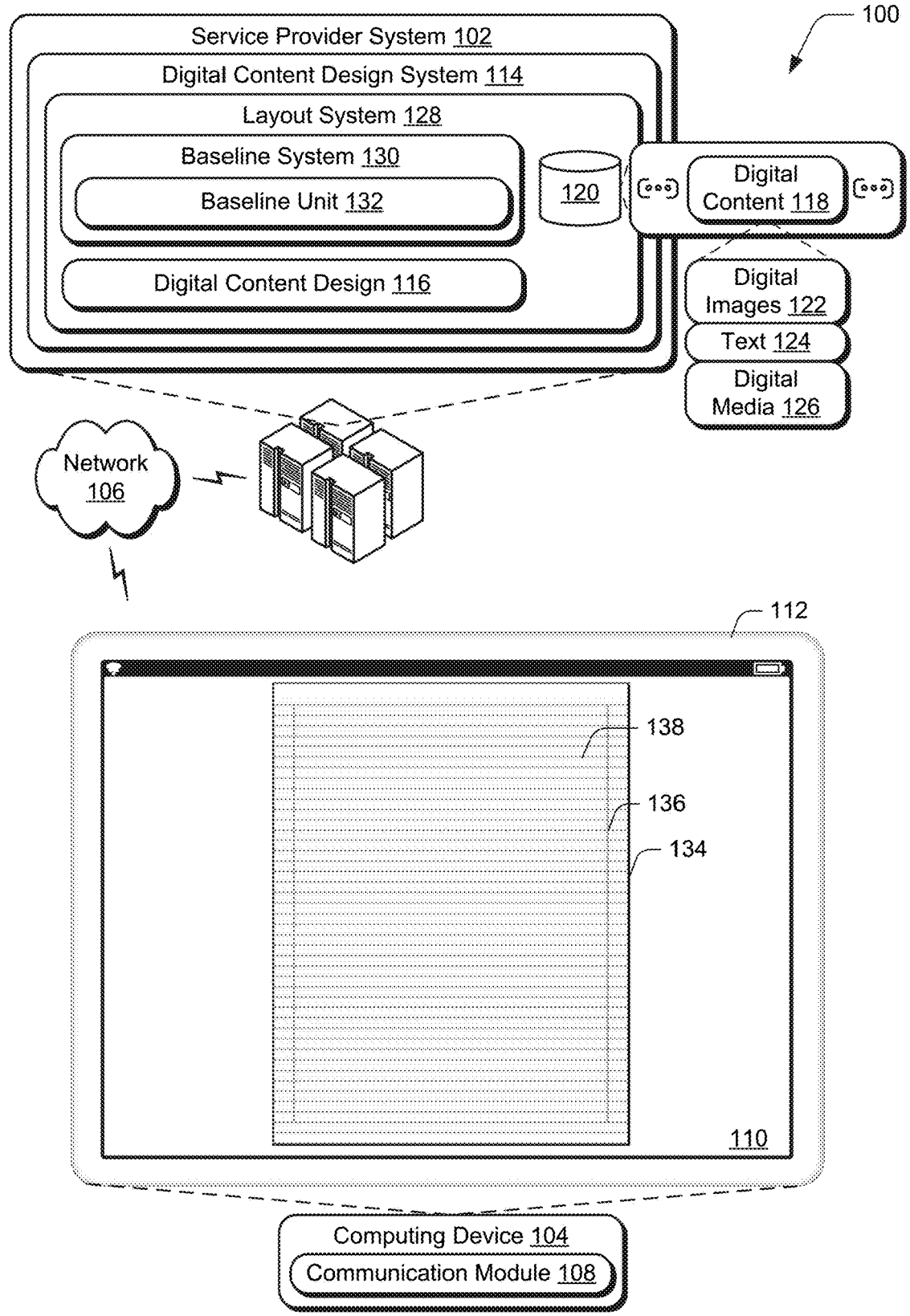
FIG. 1 is an illustration of an environment in an example implementation that is operable to employ digital content design systems and techniques as described herein that leverage baseline units to control arrangement and sizing of digital content.

Digital content design system techniques are described using baseline units to control arrangement and sizing of digital content. These techniques and systems support increased computational efficiency of a computing device and well as increased user efficiency in interacting with the computing device that incorporates these techniques. To do so, these techniques and systems overcome limitations of conventional techniques by basing display characteristics of a page to an available display area of the page.

In one example, a digital content design system receives a user input specifying a number of baselines to be included within an available display area of a page. Baselines are used to align digital content to control arrangement of the digital content within the page. Text, for instance, may be arranged based on the baselines such that a bottom of the text is aligned to the baselines similar to writing on a ruled notebook. Accordingly, the digital content design system may evenly space the number of baselines within an available display area of the page, e.g., within the margins.

From this, the digital content design system then calculates a baseline unit from a distance used to space adjacent baselines of the number of baselines from each other. This baseline unit is then leveraged by the system as a fundamental unit of measure to control arrangement and/or sizing of digital content in relation to each other. A user input, for instance, may be received to set an amount of space before or after a paragraph, an amount of leading, indent, margins, baseline shift, a document grid, ruler guides, and so on as units of the baseline grid. In this way, the display characteristics may be tied to an actual page used to display the digital content, which is not possible using conventional techniques that are based on standardized units of measure that are independent of the page.

Conventional techniques to evenly space baselines within a page, for instance, require a user to manually engage in a trial-and-error to arrive at an even spacing of baselines within the page, the spacing of which is defined using points, e.g., 1.3 pixels. Likewise, font sizes and spacing before and after paragraphs (i.e., "leading") is also defined conventionally using points. Other display characteristics that are defined using standardized units of measure (e.g., inches or centimeters) suffer from similar challenges, e.g., to set margins or indentations. This problem is further exacerbated in conventional techniques when changes are made to the page, e.g., to change the margins or page size which may require manual re-computation of each of these display characteristics.

In the techniques described herein, however, the digital content design system automatically generates baselines within an available display area in response to a user input. A user input, for instance, may be received the specify nine baselines, which are then evenly spaced by the digital content design system within an available content display area of the page, e.g., within margins of the page, based on a "start at" value, the page as a whole, and so on. The digital content design system may also automatically adjust each of these display characteristics when changes are made to the baseline unit, e.g., a spacing between baselines. In this way, the digital content design system may improve user interaction and use of computational resources of a computing device that employs these techniques.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ digital content design techniques described herein that employ baseline units to control arrangement and sizing of digital content. The illustrated environment 100 includes a service provider system 102 and a computing device 104 that are communicatively coupled, one to another, via a network 106. A variety of computing device configurations may be used to implement the service provider system 102 and/or computing device 104.

A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown, a computing device may be representative of a plurality of different devices, such as multiple servers utilized by a business to perform operations "over the cloud" as shown for the service provider system 102 and as described in FIG. 28.

The computing device 104 is illustrated as including a communication module 108 that is configured to communicate and support interaction with the service provider system 102. The communication module 108, for instance, may be configured as a web browser, a network-enabled application, and so on to access a digital content design system 114 via the network 106. The computing device 104 is also illustrated as including a user interface 110 as rendered by a display device 112 that supports user interaction, e.g., through use of a cursor control device, spoken utterances, touchscreen functionality, through use of a natural user interface, and so forth. Although functionality to generate a digital content design system 114 usable to generate and implement a digital content design 116 is described in the following as implemented by the service provider system 102, this functionality may be implemented partially or as a whole by the computing device 104, e.g., through local execution by a processing system and computer-readable storage media.

The digital content design system 114 is further illustrated as including functionality to maintain, manage, and distribute digital content 118, which is illustrated as stored by a storage device 120. Digital content 118 may take a variety of forms, such as digital images 122, text 124, digital media 126 (e.g., vector graphics, illustrations, digital videos, digital audio), and so forth. Although illustrated included as part of the digital content design system 114, this functionality may also be incorporated separately (e.g., remotely) from the system, e.g., locally by the computing device 104.

The digital content design system 114 also includes a layout system 128 that is configured to generate and maintain a layout of the digital content design 116. Accordingly, a creative professional may interact with the digital content design system 114 via the computing device 104 to create a digital content design 116 that is usable to support arrangement of digital content 118. The creative professional, for instance, may select items of digital content 118 and arrange and size these items in relation to each other as part of creating the digital content design 116 through interaction with the user interface 110.

As part of this, the layout system 128 includes a baseline system 130 that is usable to aid generation of a layout of the digital content 118 as part of the digital content design 116. To do so, the baseline system 130 calculates, updates, and manages a baseline unit 132 that defines a fundamental unit of a page 134 that is to be used to control arrangement and/or size of display characteristics of the digital content 118 within a page 134. The page 134, for instance, includes an amount of available content display area 136 that is usable to display digital content 118, e.g., within defined margins of the page 134.

In the illustrated example, the page 134 is configured to mimic notebook paper that includes a plurality of baselines 138 which are displayed as horizontal visual guides as rendered in the user interface 110. The baselines 138 are used to align and/or size digital content 118 such as text 124, e.g., where each letter of the text is positioned onto the baselines 138 similar to writing in a ruled notebook.

The baseline unit 132 is calculated by the baseline system 130 based on distance used to space these baselines 138 within the available display area 136, one from another. This may then be used, along with user inputs, to define display characteristics of the digital content 118 such that these display characteristics are tied to the page 134. Defining the display characteristics using the baseline unit 132 as a fundamental unit of measure ensures that when dimensions or sizing of the available display area 136 within a page changes, these changes are automatically populated to the corresponding display characteristics. This is not possible using conventional techniques in which a unit of measure used to define these display characteristics is independent of the page, e.g., using points, inches, centimeters, and so on. Thus, these techniques increase user and well as computational efficiency by permitting changes in real time to display characteristics based on changes to the underlying baseline unit 132.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Digital Content Design System Using Baseline Units

Figure 2:
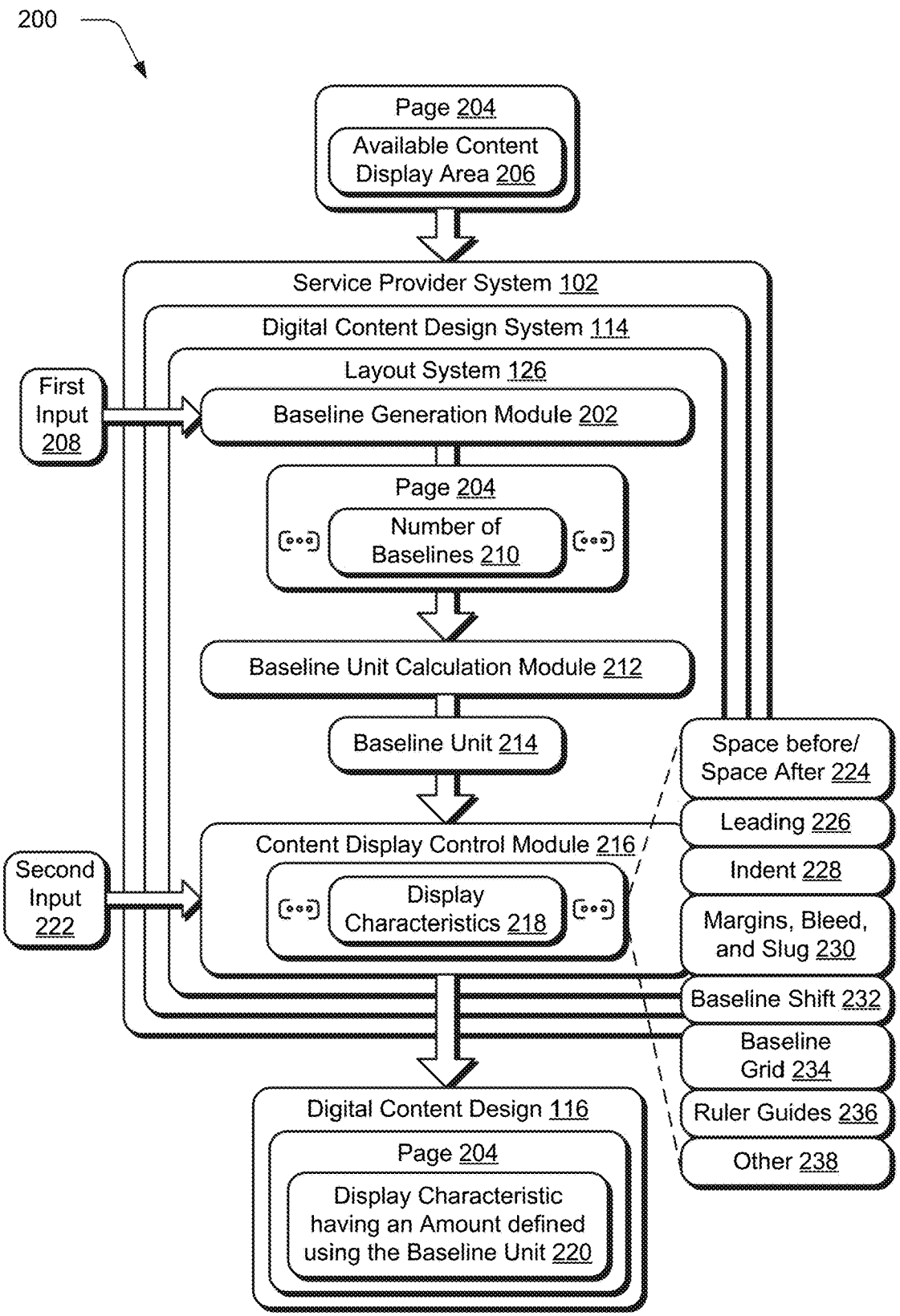
FIG. 2 depicts a system in an example implementation showing operation of a digital content design system of FIG. 1 in greater detail as generating a digital content design in which baseline units are used to guide arrangement and sizing of digital content within the design.
Figure 3:
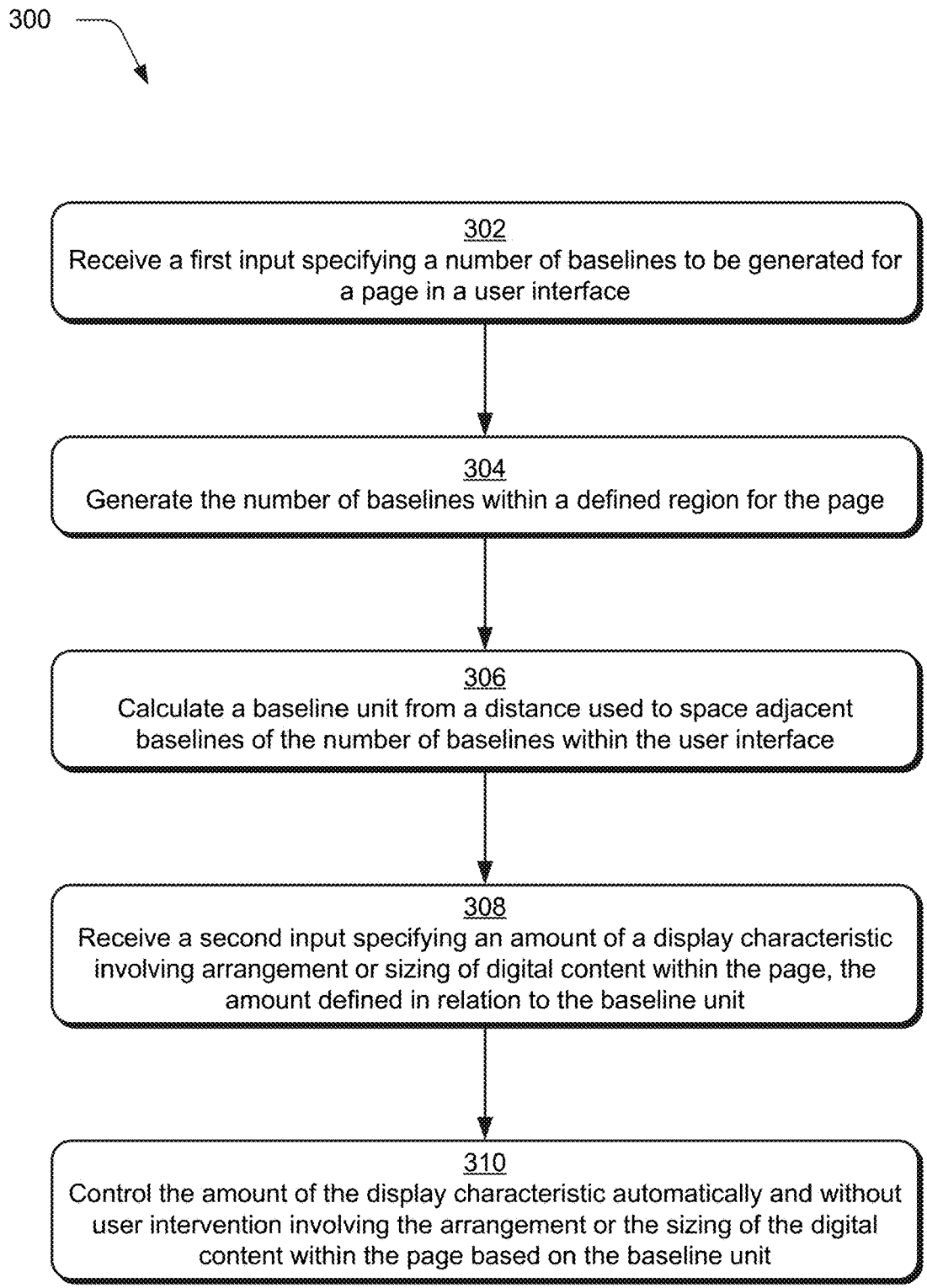
FIG. 3 is a flow diagram depicting a procedure in an example implementation in which a baseline unit is calculated based on a number of baselines distributed within a page and used to control display characteristics of digital content within the page.

FIG. 2 depicts a system 200 in an example implementation showing operation of the digital content design system 114 of FIG. 1 in greater detail as generating a digital content design in which baseline units are used to guide arrangement and sizing of digital content within the design. FIG. 3 depicts a procedure 300 in an example implementation in which a baseline unit is calculated based on a number of baselines distributed within a page and used to control display characteristics of digital content 118 within the page.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference will be made interchangeably to FIGS. 3-4 and continues throughout the remaining figures.

To begin, a baseline generation module 202 of the layout system 126 receives a page 204 having an available content display area 206, e.g., a space between top and bottom and/or left and right margins. A first input 208 is received by the baseline generation module 202 that specifies a number of baselines to be generated for a page in a user interface (block 302). The first input 208, for instance, may be received via a user interface 110 from a user that specifies the number via text entry, a spoken utterance, gesture, and so forth.

The number of baselines is generated by the baseline generation module 202 within a defined region for the page (block 304), e.g., an available content display area 136 within defined margins of the page 134. To do so, the baseline generation module 202 calculates a distance between consecutive baselines to evenly space the baselines within the defined region. The distance between the baselines depends on a number of baselines as specified by the first input 208 and an amount of display area available along an axis, along which, the baselines are to be spaced, e.g., an effective page height.

Figure 4:
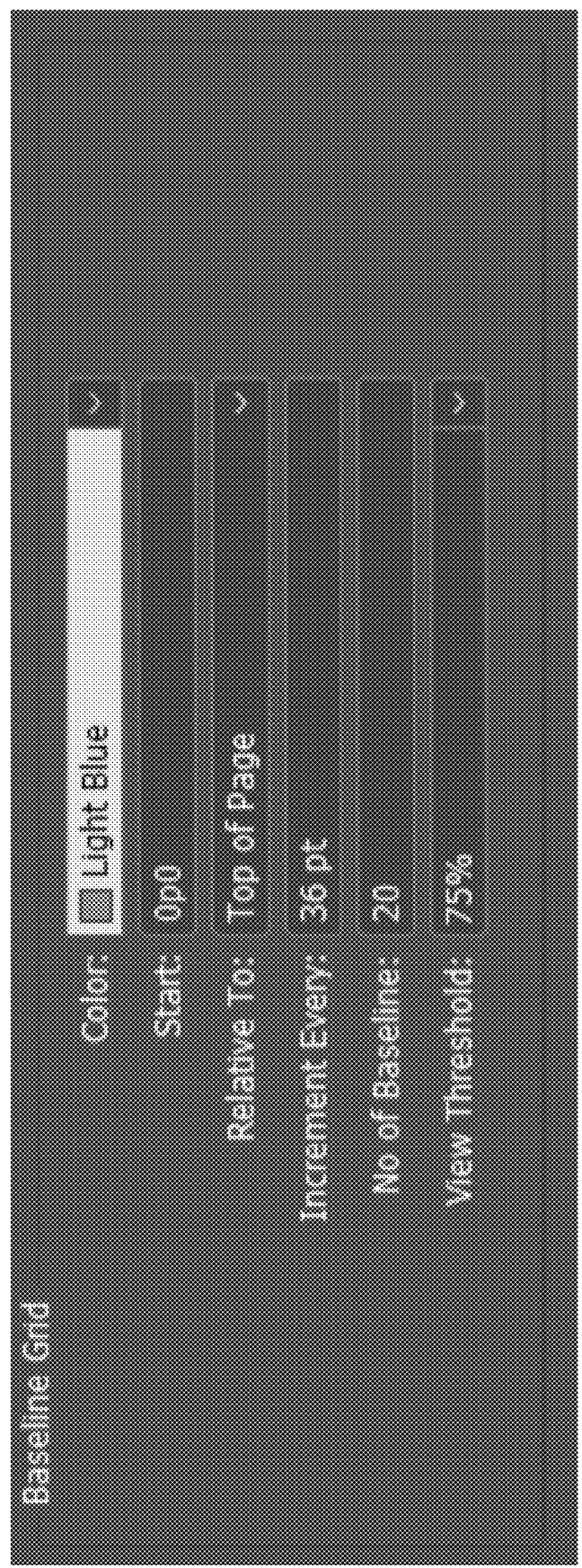
FIG. 4 depicts a user interface usable to specify a number of baselines.

In one example, a number of baseline units specified by the first input 208 is denoted as "no_of_baselines" and the effective page height that contains the baselines is denoted as "effective_height." The effective page height is based on values of "start" and "relative to" as shown in an example implementation 400 of FIG. 4. As shown in an example implementation 500 of FIG. 5, a value of "relative to" may have two values, e.g., "start_from" and "relative_to," and in the following the variables of "top_of_page" and top_margin" are used to denote them. The technique depicted in FIG. 4 is implemented by the baseline generation module 202 to determine spacing and placement of baselines within the available content display area. As depicted, baseline units are updated automatically based on the distance, at which, the baselines are spaced in response to detected changes in a size of the available content display area.

The page 204 and number of baselines 210 are then passed to a baseline unit calculation module 212 that is configured to calculate a baseline unit 214 from a distance used to space adjacent baselines of the number of baselines within the user interface (block 306). An example 600 of a technique usable to calculate and set the baseline unit 214 as a fundamental unit of measure of display characteristics is depicted in FIG. 6.

Figure 7:
FIG. 7 depicts an example implementation of a user interface to set a document grid according to a golden ratio.

The baselines and baseline units may also be employed as part of a baseline grid formed from sets of baselines that are disposed in generally perpendicular directions to each other, e.g., horizontally and vertically. To do so, horizontal and vertical divisions are generated, which may be denoted as "horizontal_gridline_every" and "vertical_gridline_every," respectively. The baseline grid may be distributed using a variety of ratios, such as a golden ratio, a square ratio, or a custom ratio as specified by user input via a drop down menu. An example of a user interface 700 usable to provide a first input to specify the number of baselines to be employed horizontally and vertically to form a baseline grid is depicted in FIG. 7.

FIG. 8 depicts an example technique 800 usable to space baselines to form a baseline grid based at least in part on a custom ratio, a square ratio, or a golden ratio defined within an available content display area within a page. Like the previous example, the document grid may be updated by the baseline generation module 202 and baseline unit calculation module 212 due to changes to "baseline_distance" in this example.

Return will now be made again to FIG. 2, in which the baseline unit 214 as calculated by the baseline unit calculation module 212 is passed to the content display control module 216 to control display characteristics 218 by using the baseline unit 214 as a unit of measure. In this way, updates to the baseline unit 214 may be automatically populated to the display characteristics 218 such that a digital content design 116 is generated that include a page 204 in which a display characteristic is defined as having an amount based on the baseline unit 220.

Figure 9:
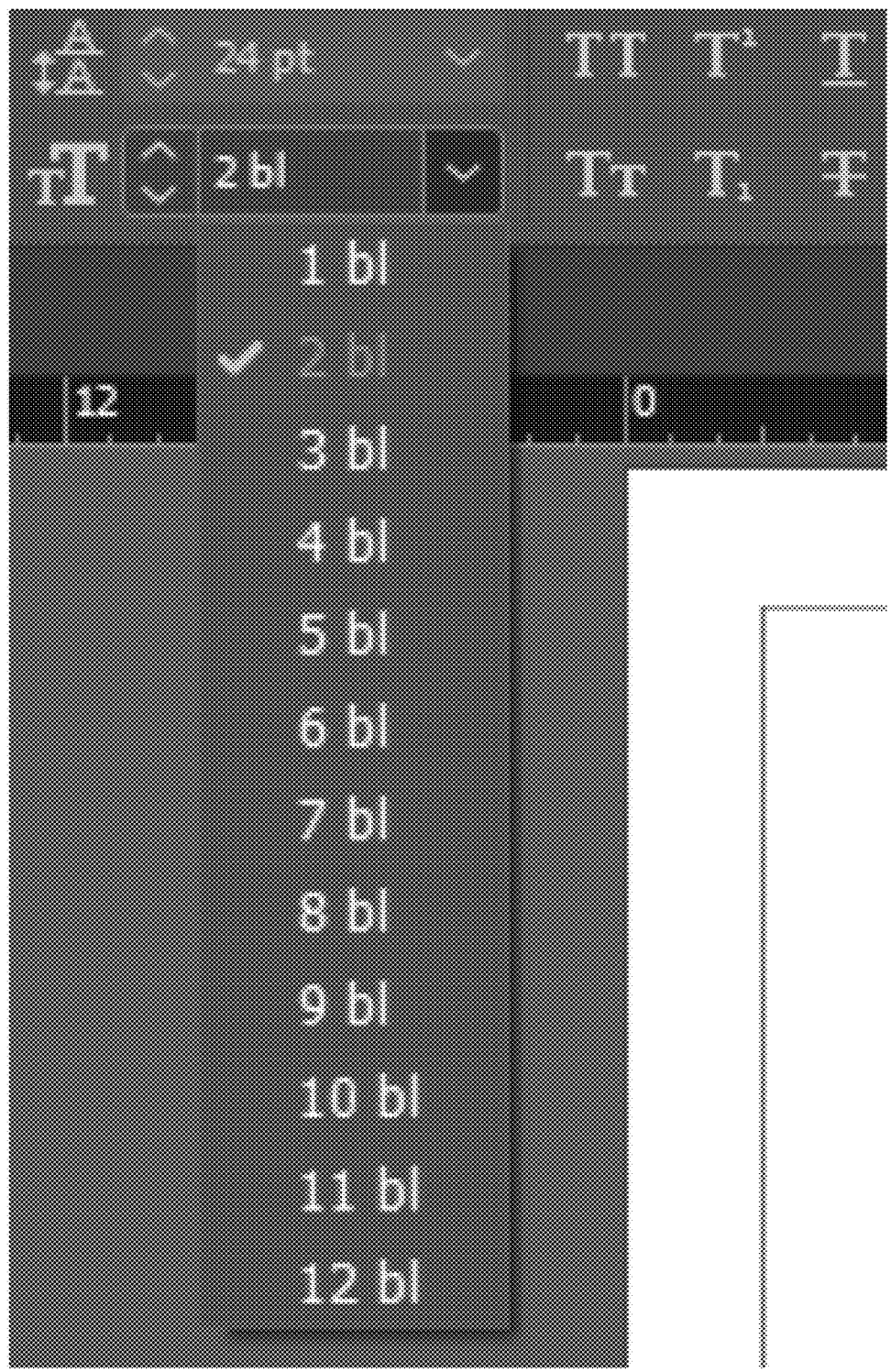
FIG. 9 depicts an example implementation of a user interface in which baseline units are used to set a text size.

For example, a second input 22 is received by the content display control module 216 that specifies an amount of a display characteristic involving arrangement or sizing of digital content within the page. The amount is defined in relation to the baseline unit (block 308). The amount of the display characteristic is then controlled automatically and without user intervention involving the arrangement or sizing of the digital content within the page based on the baseline unit (block 310). Examples of display characteristics 218 that are definable in relation to a baseline unit 214 include spacing before and after 224 a block of text (e.g., a paragraph), leading 226, indent 228, margins, bleed, slug 230, baseline shift, 232, spacing of a baseline grid 234 horizontally and/or vertically, ruler guides 236, and other 238 display characteristics. Another example 900 of providing the second input 222 is depicted in FIG. 9 in which baseline units are used to specify a font size.

In this way, a creative professional may begin creation of the digital content design 116 by selecting a page 204 having a height and width or manually specifying a size of the page 204. In order to create baselines, a first input 208 is provided through interaction with a user interface 110 to specify a number of baselines 210. The number of baselines 210 are then generated automatically and without user intervention by the baseline generation module 202 without any other calculations by the creative professional, which are distributed equally across the page 204 in an example.

The baseline unit calculation module 212 then generates a baseline unit 214 "bl" from a distance used to space adjacent baselines of the number of baselines 210. The baseline unit 214 is then used by the content display control module 126 as a fundamental unit and may be updated automatically in response to changes in the available content display area and as such, may cause these updates to be automatically propagated to the display characteristics 218.

For example, consider a page 204 as having a height of five hundred points and a width of three hundred points. A creative professional may then provide a first input 208 of "number of baselines" as fifty. This results in calculation of a baseline unit 214 as equal to "500/50=10 points." The creative professional may then provide the second input 222 to specify amounts of display characteristics based on this baseline unit 2124 "bl." Margins, for instance, may be set as "four baseline units" from each edge of the page 204. A font size may also be defined as "two baselines units" with a leading as "three baseline units." Sizes of digital content and positioning may also be defined using baseline units as shown in an example implementation 1000 of FIG. 10.

The creative professional may then wish to increase a size of the page 204 to have a height of seven hundred points and a width of four hundred points. In response, the baseline unit calculation module 212 automatically updates the baseline unit 214 "bl" to have a size of "700/50=14 points." This change in the baseline unit 214 causes the content display control module 216 to automatically update the display characteristics 218 that are defined based on the baseline unit 214.

Figure 10:
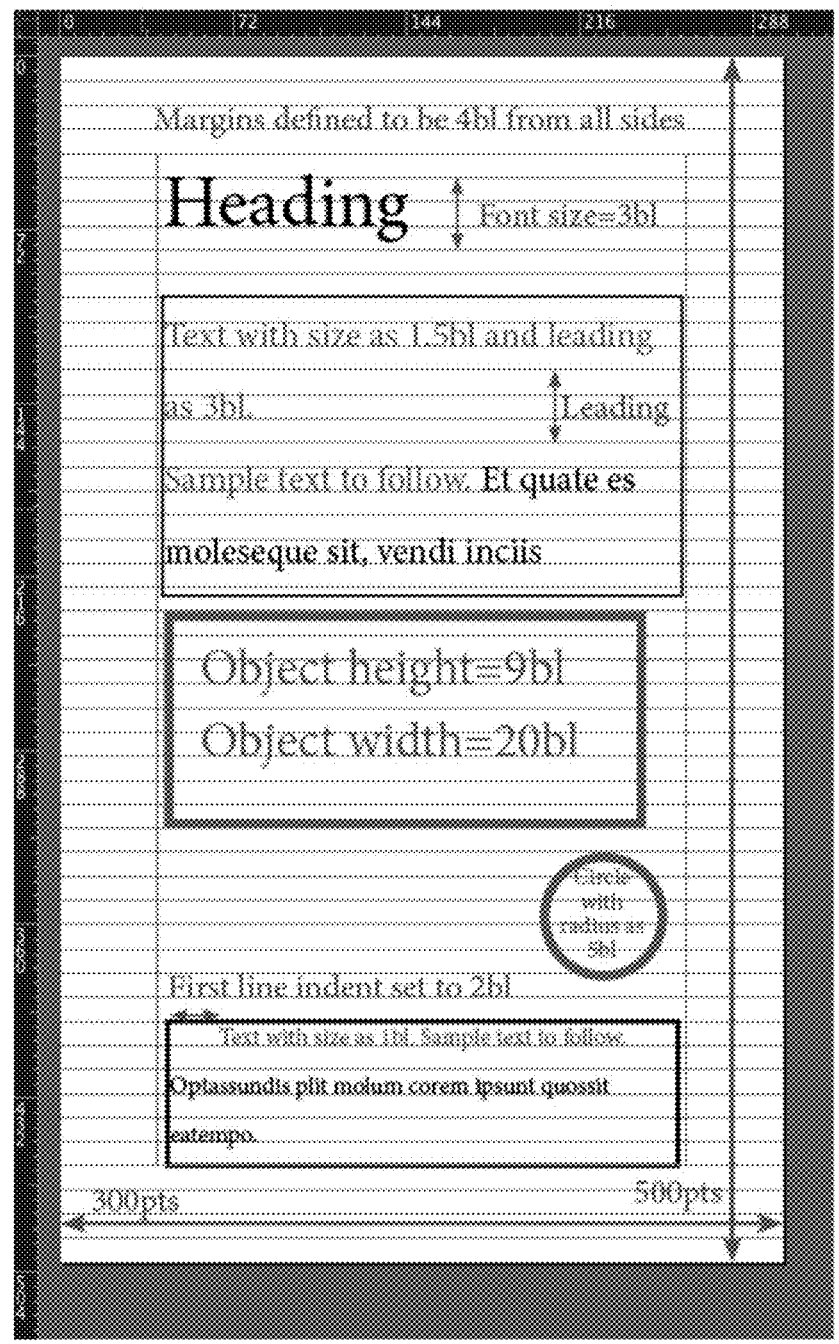
FIG. 10 depicts an example implementation of a page in which baseline units are used to set sizes and arrangement of digital content.
Figure 11:
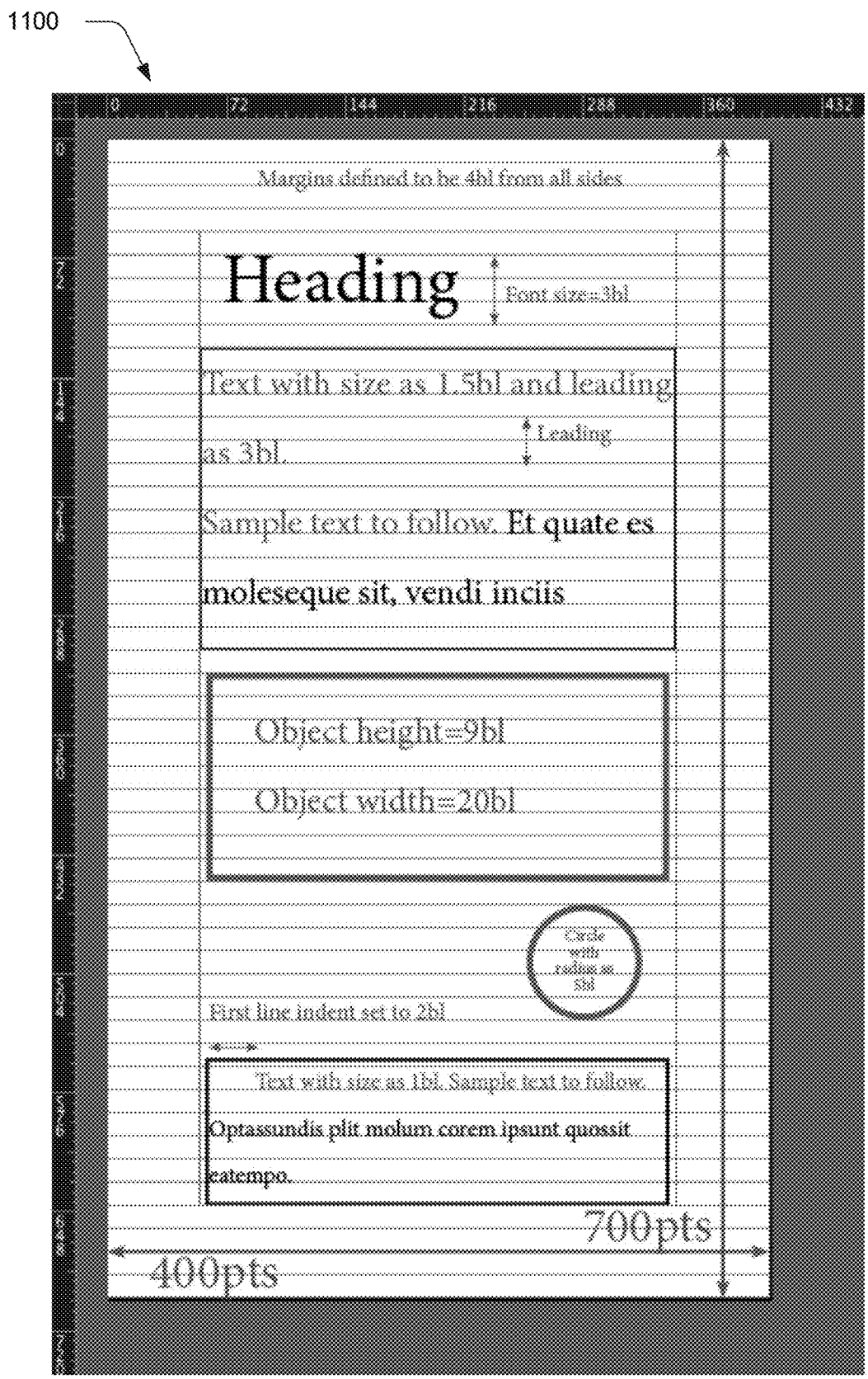
FIG. 11 depicts an example of automated adjustment of display characteristics of a page of FIG. 10 based on a change in the baseline unit.

FIG. 11 depicts an example 1100 of automated adjustment of the display characteristics of a page of FIG. 10 based on a change in the baseline unit 214. As depicted, a font size is still defined as three baseline units, but is larger in size such that the font remains proportional to an increase in size of the page.

Figure 12:
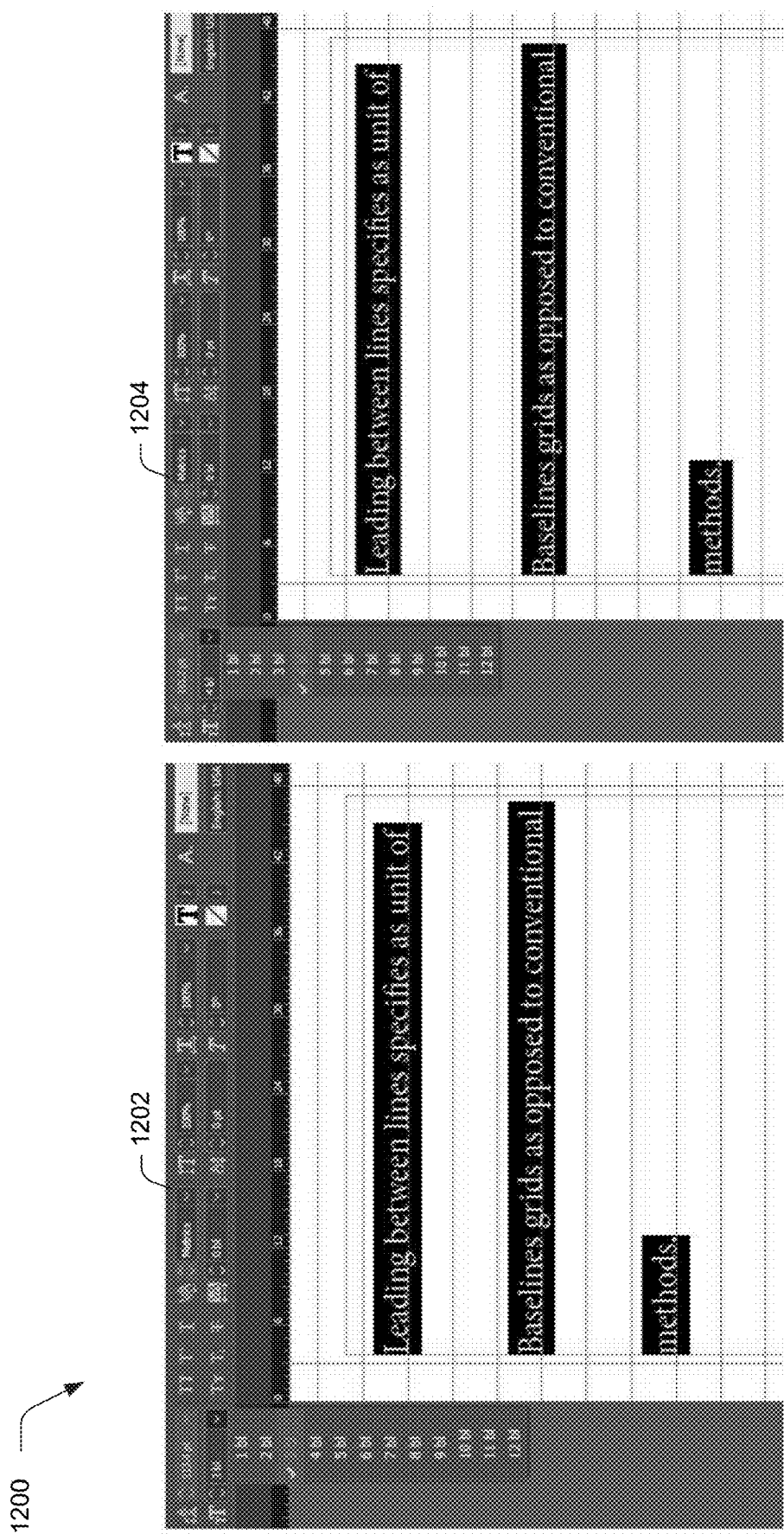
FIG. 12 depicts an implementation of automated adjustment of leading as spacing between items of digital content.

FIG. 12 depicts an implementation 1200 of automated adjustment of leading as spacing between items of digital content. In a first example 1202, an amount of leading is set to "3 bl" and in a second example 1204 an amount of leading is set as "4 bl." Leading specifies an amount of a gap or space that is used to space items of digital content (e.g., lines of text) from each other.

Figure 13:
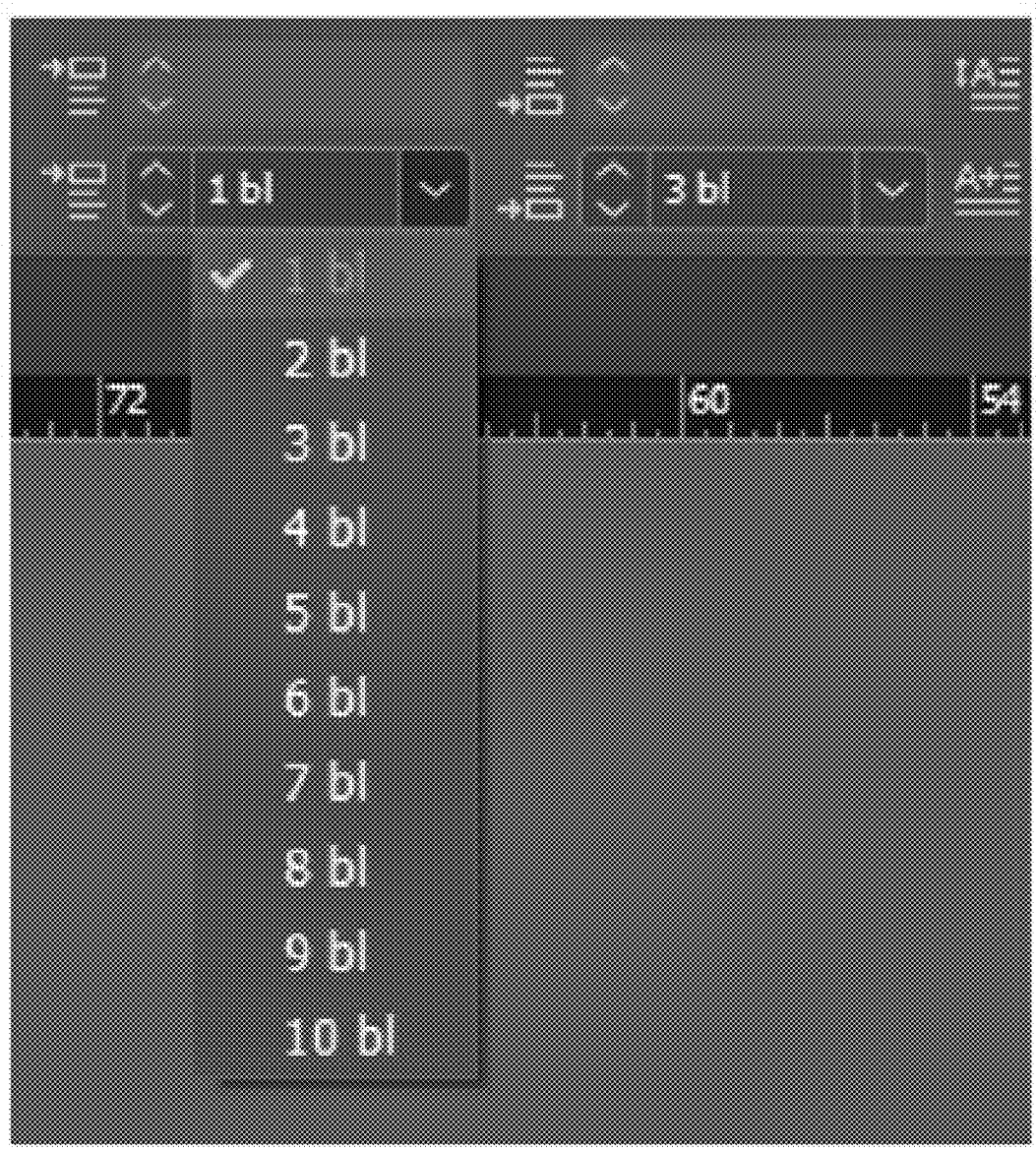
FIG. 13 depicts an example user interface usable to assign an amount of spacing before or after paragraphs using baseline units.
Figure 14:
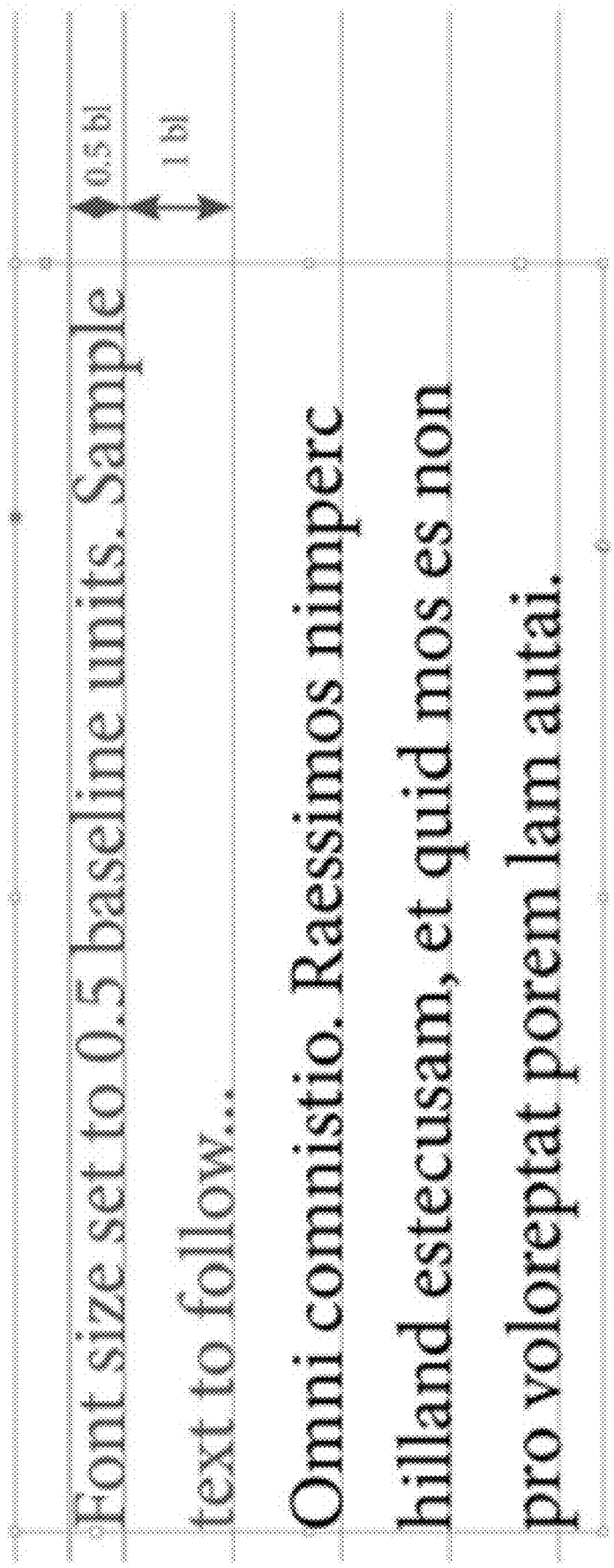
FIG. 14 depicts another example of a display characteristic of font size that is defined using baseline units.
Figure 15:
FIG. 15 depicts yet another example of a display characteristic of font size that is defined using baseline units.

FIG. 13 depicts an example 1300 user interface usable to assign an amount of space before or after paragraphs using baseline units. FIG. 14 depicts another example 1400 of a display characteristic of font size that is defined using baseline units. As illustrated, the font size is set to "0.5 baseline units" and thus a size of the font has half the value of a baseline unit that is defined for the page. Similarly, a font size may be set to "2.0 baselines units" and thus a size of the font has double a value of a baseline unit as shown in an example 1500 of FIG. 15.

This provides increased flexibility and efficiency in user interaction with the digital content design system 114 in that the creative professional may easily set up and change display characteristics of digital content and amounts of a content display area that is available to display this digital content. Thus, the techniques and systems described herein may overcome a variety of challenges of conventional design techniques.

FIG. 16 depicts an example implementation 1600 showing use of a baseline unit as preventing unequal spacing being left at a top or bottom edge of a page while setting up a baseline grid. Conventional techniques define spacing between baselines using units of measure that are independent of a size of a page, e.g., points, centimeters, inches, and so forth. Therefore, in practice unusable gaps are typically introduced when spacing baselines based on mistakes caused by user computation of spacing between the baselines. In the illustrated example, however, a first input 208 specifying a number of baselines as equal to ten causes the baseline generation module 202 to generate ten baselines to be distributed evenly over an available content display area for a page automatically and without user intervention and thus without requiring manual calculations by a user that may be prone to error.

Figure 17:
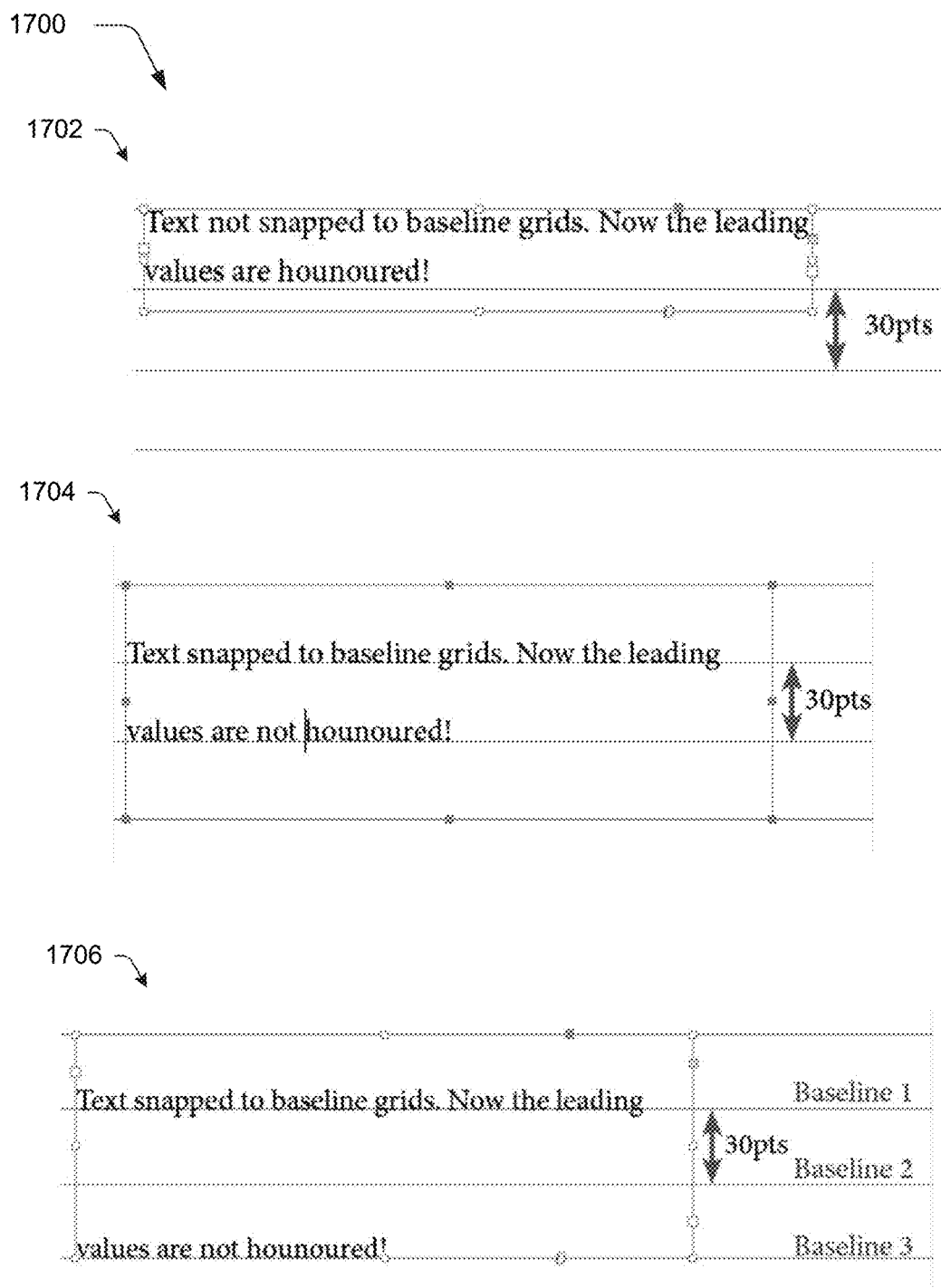
FIG. 17 depicts a prior art examples of leading and spacing values set using a number of points.

Additionally, conventional techniques used to specify baseline grids using standards of measurement that are independent of sizing of a page also involved numerous challenges. FIG. 17, for instance, depicts prior art 1700 examples of leading and spacing values set using a number of points. In a first example 1702, spacing of baselines is set to thirty points and leading is set as eighteen points, this causes a distance between baselines used to arrange text to be correct set at 18 points no matter the baseline value. In the second example 1704, the text is now set to "snap to baseline grid" then the leading values are not honored since the text lines are at a distance of thirty points instead of eighteen points, which may confuse a creative professional. In a third example 1706, a creative professional changes the leading value to a larger distance, e.g., forty eight points, which causes the text to align to a nearest baseline instead of honoring the leading options. In this scenario, the "n+1$^{th}$" set of text snaps to the third baseline after the "n$^{th}$" line since forty eight points will skip the first baseline and the next baseline is baseline 2 which is the third baseline.

Figure 18:
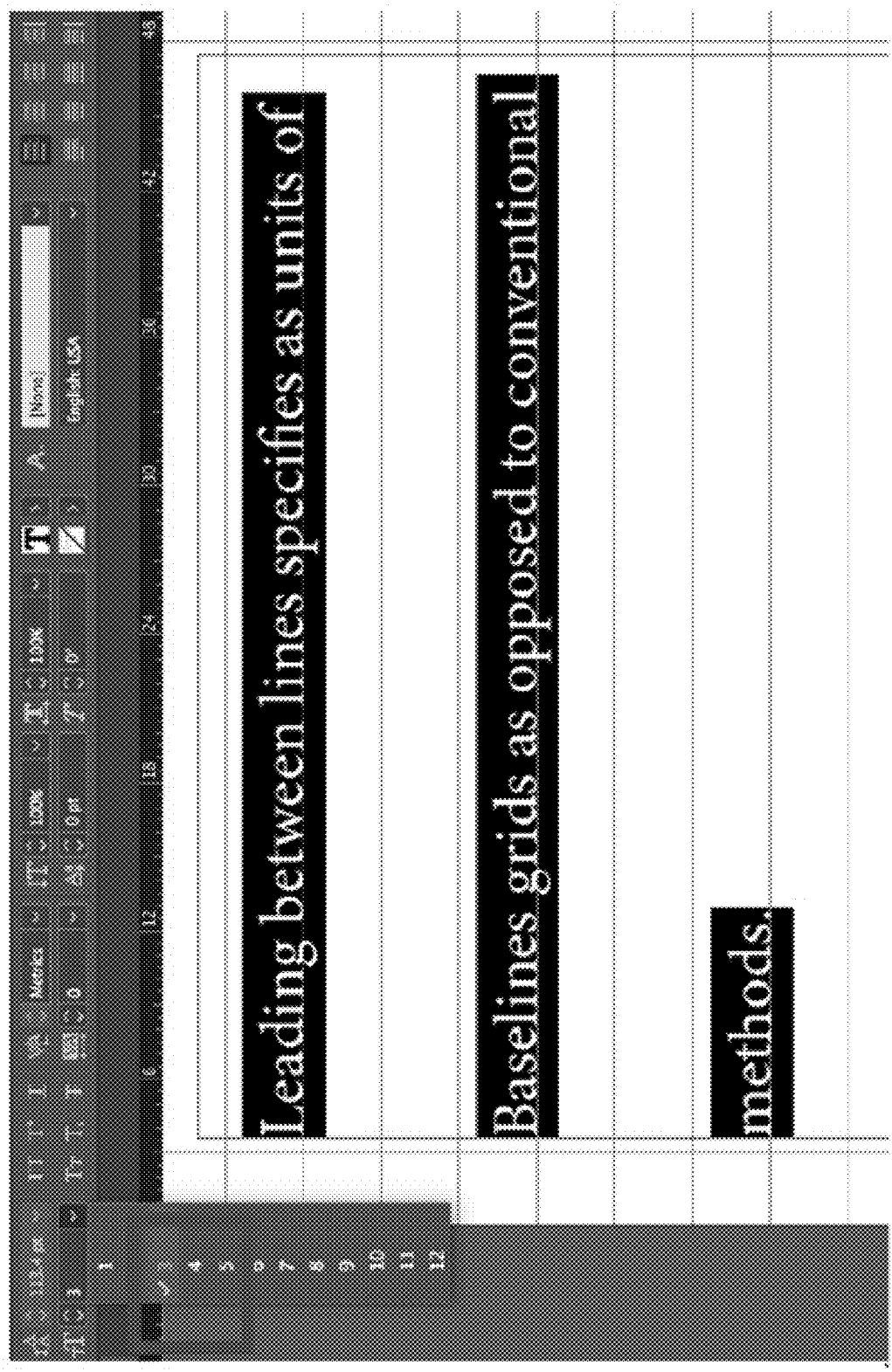
FIG. 18 depicts an example implementation in which baseline units are used to define how much of a gap is disposed between adjacent lines of text.

FIG. 18 depicts an example implementation 1800 in which baseline units are used to define how much of a gap is disposed between adjacent lines of text. In the illustrated example, an amount of leading between lines of text is defined as using a number of baselines as "3 bl" opposed to definition using standardized units of measure, such as points, picas, inches, and so forth. Thus, as before this amount may change automatically and without user intervention based on changes to a page, which is not possible using conventional techniques.

Figure 19:
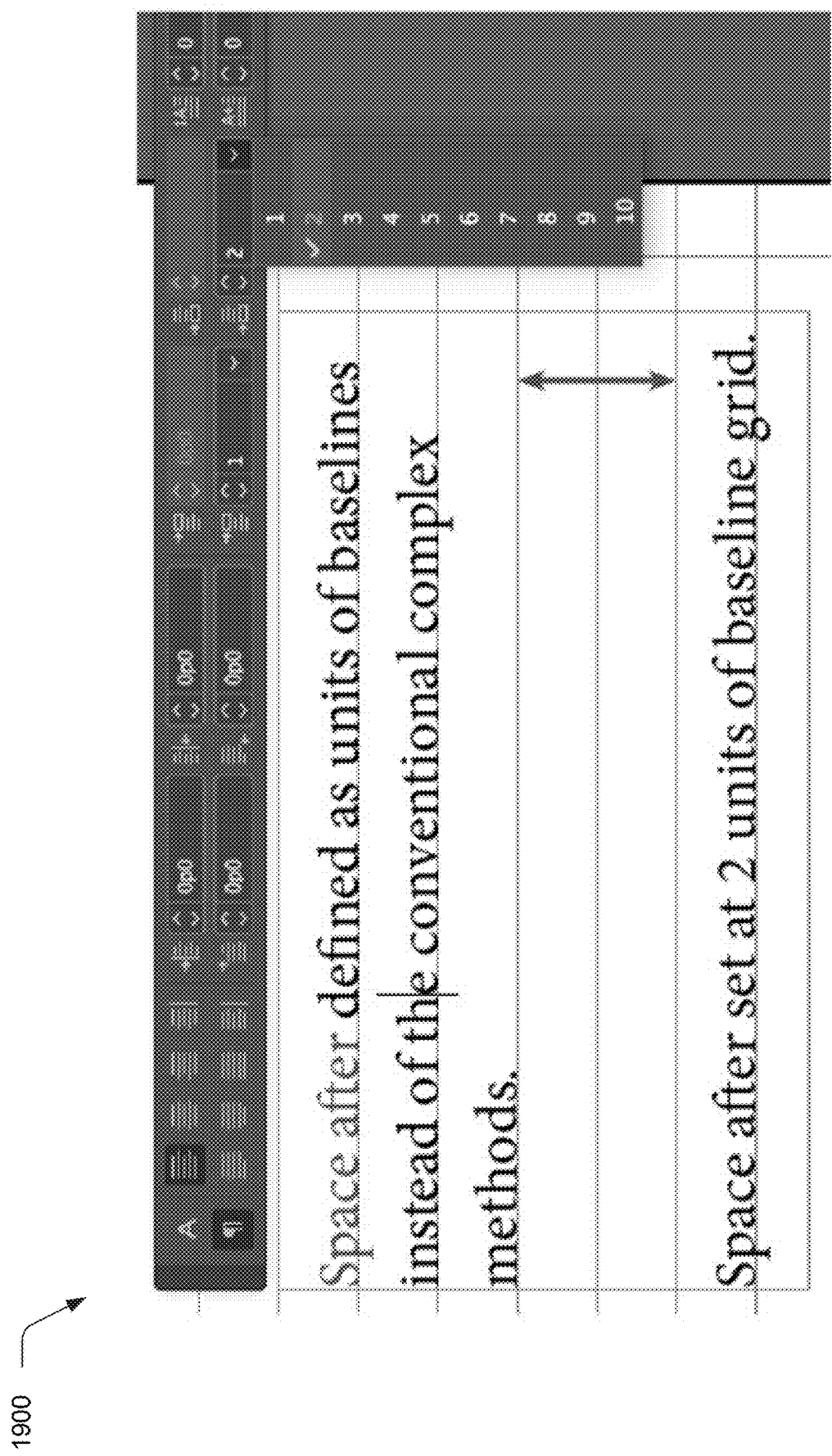
FIG. 19 depicts an example implementation in which an amount of space before or after digital content (e.g., a paragraph) is set based on baseline units.

Likewise, FIG. 19 depicts an example implementation 1900 in which an amount of space before or after digital content (e.g., a paragraph) is set based on baseline units. As previously described, other examples are also contemplated, such as first line indent and font size which is further described below.

Figure 20:
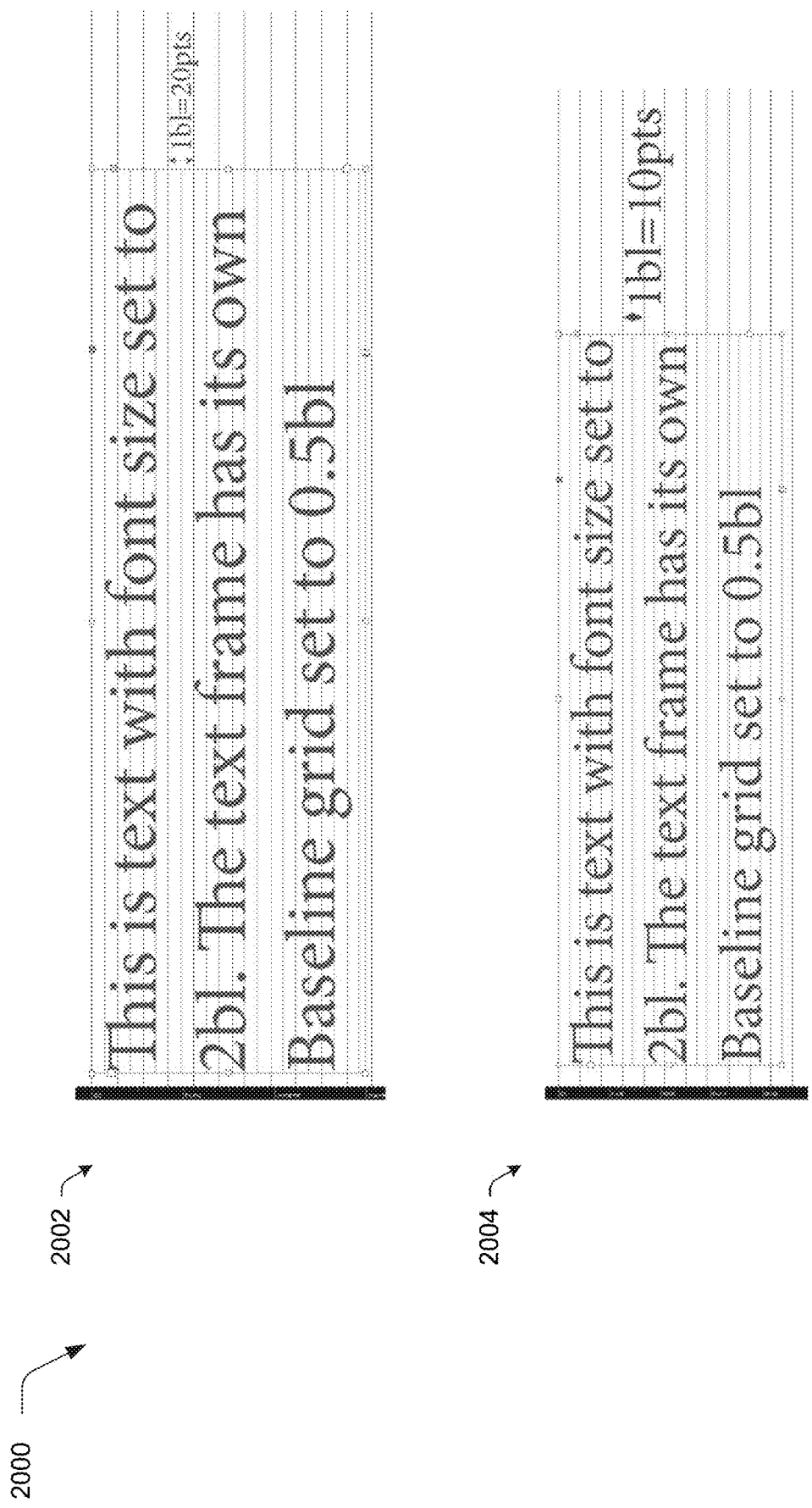
FIG. 20 depicts an example implementation in which font size is defined using baseline units.

FIG. 20 depicts an example implementation 2000 in which font size is defined using baseline units. One of the challenges in creating digital content designs is to find an appropriate font size for text. Accordingly, in the techniques described herein the font size responds to a page size. Thus, instead of use of a conventional "increment every" value, a size of the font based on a baseline grid changes in response to changes in an available content display area of a page, e.g., the page as a whole, an area within defined margins, and so forth.

In a first example 2002, consider a page in which a number of baselines is set such that a distance between the baselines is twenty points. A font size set as two baseline units causes a glyph height of forty points. If a creative professional then decreases a height of the page in half, the number of baselines is preserved. This then results a change in distance, and a change in baseline unit, from twenty points to ten points as shown in the second example 2004. Thus, automatic adjustment of the baseline unit is propagated to the font size. As a result, a creative professional may freely experiment with different layouts because the number of baselines remains preserved which makes the baseline unit correspond to dimensions of the page.

Figure 21:
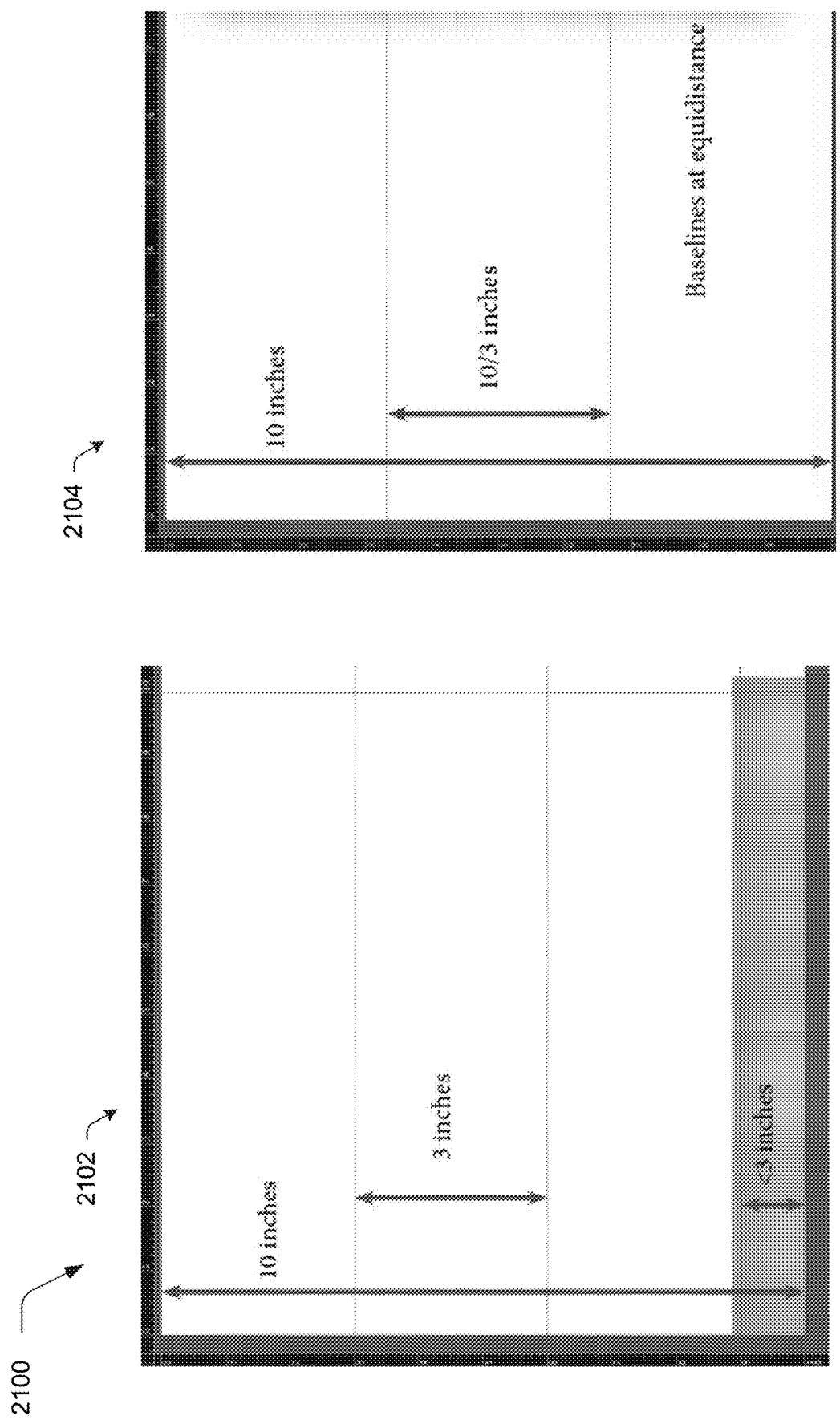
FIG. 21 depicts an example implementation of addressing unequal spacing of conventional techniques by a layout system.

FIG. 21 depicts an example implementation 2100 of addressing unequal spacing of conventional techniques by the layout system 126. As previously described, conventional techniques used to specify spacing relied on standardized units of measure. Thus, these conventional techniques relied on an ability of a creative professional to determine the spacing, which is often inaccurate.

As shown in a conventional example 2102, consider a page with a height of ten inches. A creative professional may then desired to divide this page into baselines by specifying an "increment every" option at three inches and starting at zero inches with respect to a top of the page. This leads to creations of baselines with a fragmented space left at a bottom of the page which is unusable to incorporate content and is not visually pleasing. In an example 2104 of the techniques described herein, however, the layout system 126 controls the spacing to preserve a number of baselines specified for the page. Accordingly, each of the baselines are spaced equally, one to another, leaving no unusable spaces at the bottom of the page.

FIG. 22 depicts an example implementation 2200 in which placement of an initial baseline within a baseline grid is shown. As shown at example 2202, a page has a height of six hundred points and a width of five hundred points. The baselines are set with a start of zero and increment every sixty points. If a creative professional then desires to change a start position, e.g., to thirty points, as shown at a second conventional example 2204 this causes redistribution of the baselines and ruins equal spacing of the baselines. This may also affect distribution of the baselines into additional pages. This forces the creative professional in conventional techniques to manually recalculate the spacing, which is inefficient and prone to error.

As shown at third and fourth examples 2206, 2208, however, a number of baselines included on the page is preserved regardless of a "start at" value. Like the first example 2202, the page of the third example 2206 has dimensions of a height of six hundred points and a width of five hundred points and is configured to include nine baselines. The third example 2206 includes a "start at" value of one hundred and fifty points, which is then changed to two hundred points for the fourth example 2208. The number of baselines remains constant, thereby avoiding the requirement of manual re-computation by the creative professional as required using conventional techniques.

Figure 23:
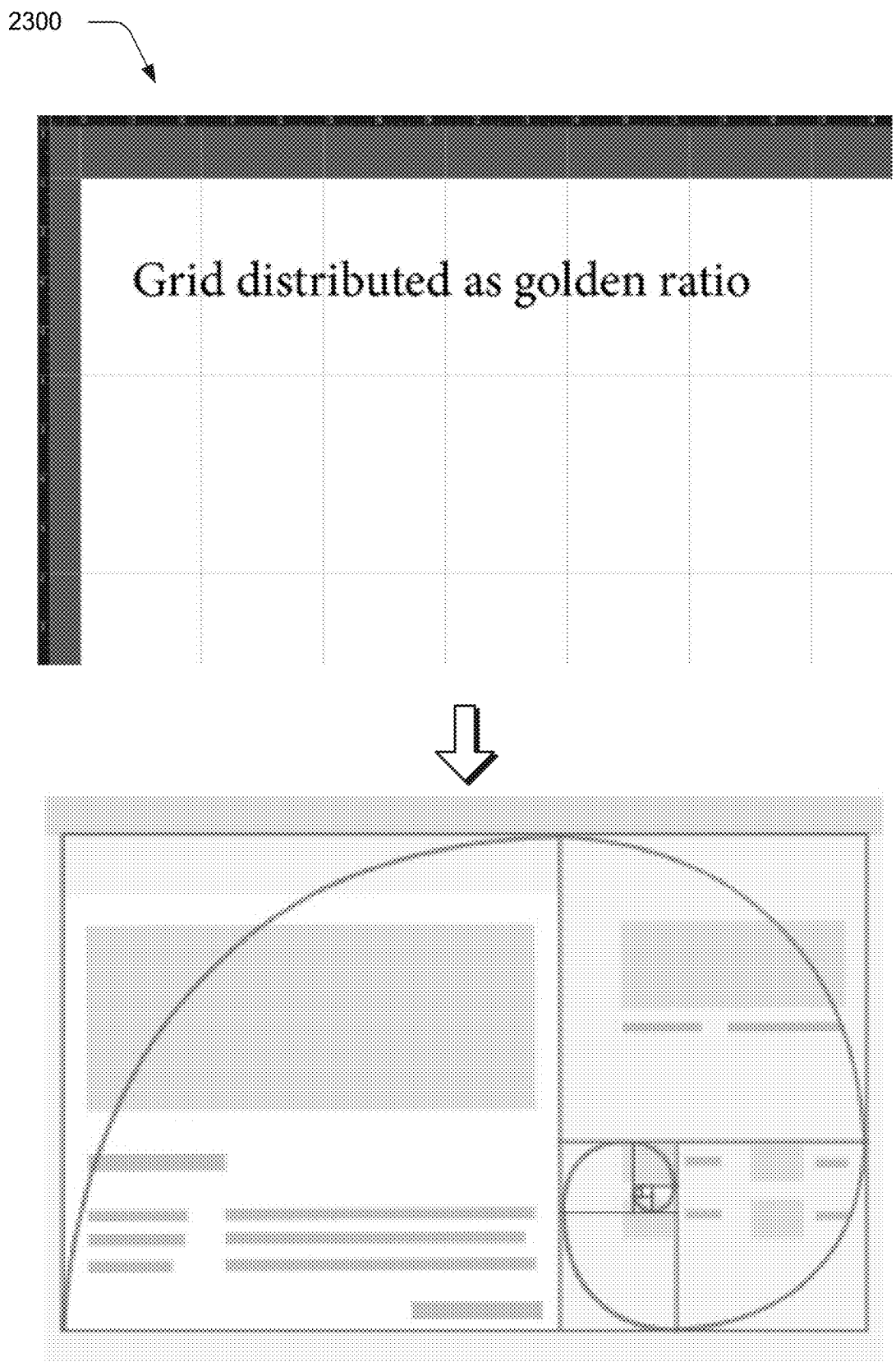
FIG. 23, for instance, depicts an example implementation in which a layout grid is defined using baseline units as distributed according to a golden ratio.

Baseline units leveraged by the layout system 126 may also be used to enforce specific ratios, such as a golden ratio, square ratio, page ratio, and so on. This is not possible using conventional techniques. FIG. 23, for instance, depicts an example implementation 2300 in which a layout grid is defined using baseline units as distributed according to a golden ratio. The golden ratio is a mathematical relationship (approximately 1.618) often spotted in nature and is valued for familiarity and visually pleasing proportions. This ratio creates a visually harmonious balance and defines where second and tertiary information, such as sidebars, are positioned and what size is to be employed and enforces a modular scale for a digital content design.

Figure 24:
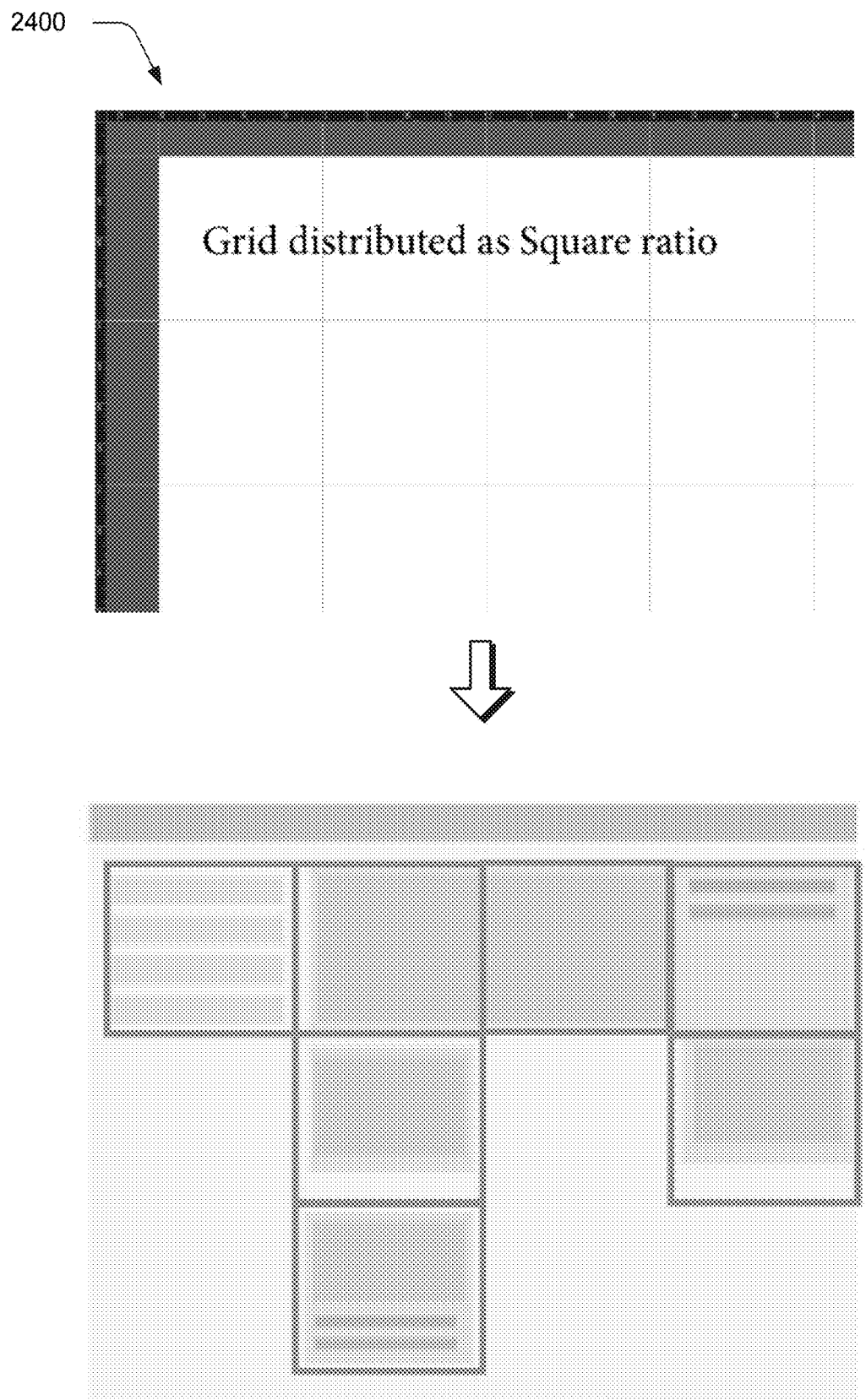
FIG. 24 depicts an example implementation in which a layout grid is defined using baseline units as distributed according to a square ratio.

FIG. 24 depicts an example implementation 2400 in which a layout grid is defined using baseline units as distributed according to a square ratio. Likewise, a square ratio is usable to create natural looking compositions that are visually pleasing to the eye. Use of the square ratio ensures a natural sense of correct composition which "feels right" mathematically. Other examples are also contemplated, such as to enforce a "rule of thirds." These layouts are not possible using conventional techniques that requires creative professionals to define spacing manually using units of measure that are independent of a page, on which, content is to be disposed.

Thus, the techniques described herein also permit a correlation between document grid size and distances used to distribute gridlines within the grid, which is not possible using conventional techniques. For example, a creative designer may with to align document grids with baseline grids to permit snapping behavior with respect to horizontal lines in a document grid, such as to align text and other objects of digital content uniformly within a page. In conventional techniques, this may be difficult if not impossible to perform.

In one conventional example, a page has a height of six hundred points and a width of five hundred points. The baseline grid is created with a "start at" value of zero points and "increment every" is set at fifty points. With careful calculations, a creative professional may manage to initially overlap the baseline grid with the document grid. However, a change to the "increment every value from forty to fifty points would cause lines of the document grid to no longer align with the baseline grid.

Figure 25:
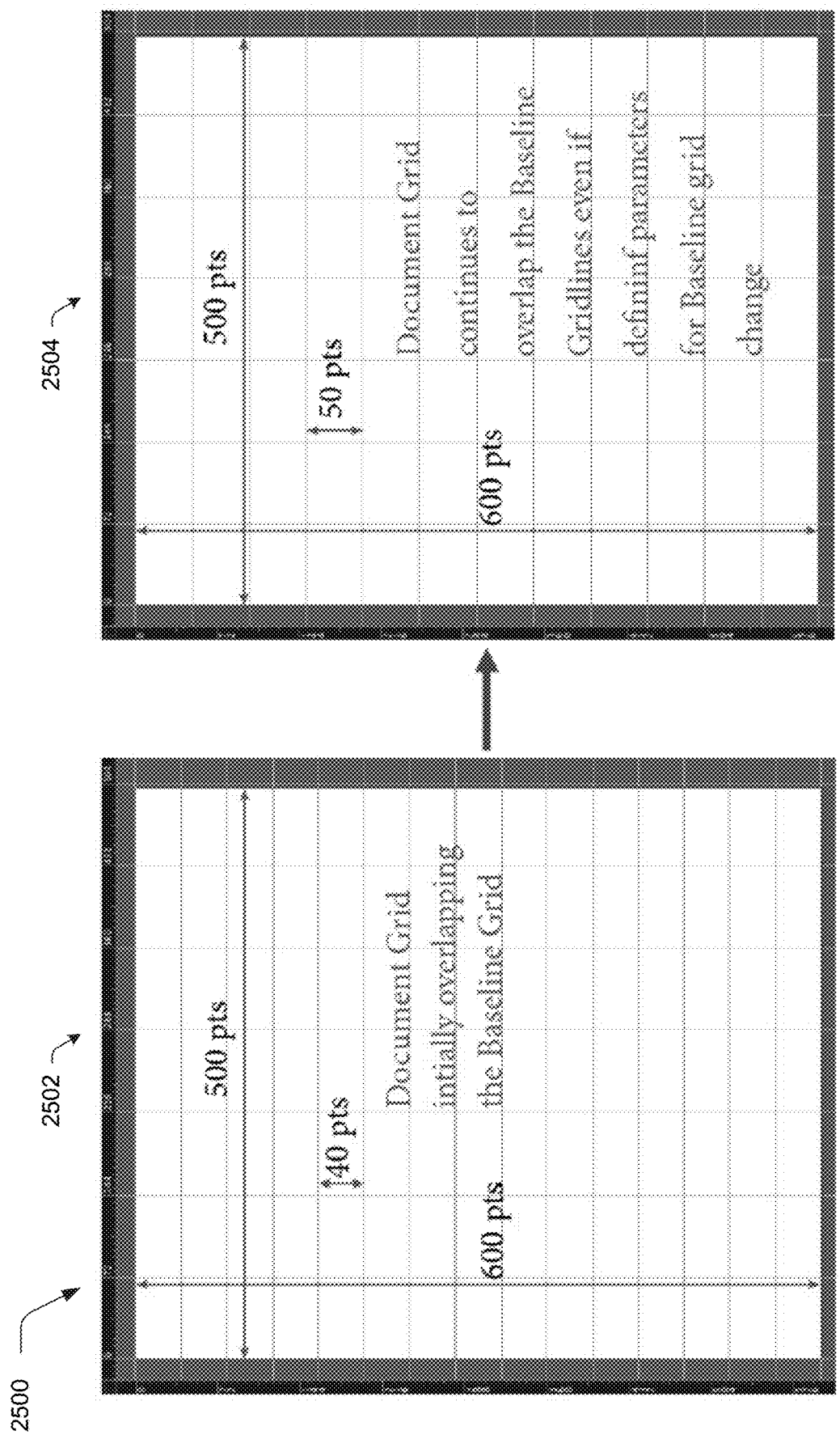
FIG. 25 depicts an example implementation of an option to link a document grid's distribution to baselines forming a baseline grid.

Accordingly, the techniques described herein support an option to link a document grid's distribution to baselines forming a baseline grid. As shown in an example implementation 2500 of FIG. 25, for instance, at a first example 2502 a page is configured as having a height of six hundred points, a width of five hundred points with a "start at" value of zero and a "number of baselines" set as fifteen, which gives a distance and thus a baseline unit of forty points. If a value of the "number of baselines" is decreased to twelve, the layout system 146 automatically redistributes baselines of the document grid based on an updated baseline unit value of fifty, as shown at the second example 2504. Further, since a distance between the baselines of the grid has increased from forty to fifty points, spacing of horizontal baselines of the grid also has an increased distance to address this change.

In another example, a "gridline every" value is supported to define horizontal and/or vertical gridlines using baseline units as a unit of measure. A page, for instance, may have a defined height of five hundred points with ten baselines generated beginning from a "start at" value of one hundred points. The available display area of the page is thus four hundred points and hence a distance between each baseline is calculated as forty points. If the "gridline every" field is set to two baseline units, then the grid's horizontal spacing is updated to eighty points by the system.

Similarly, if a horizontal "gridline every" field is set to half of a baseline unit, then the grid's horizontal spacing is set at twenty points in this example This ensures that the document grid is distributed as a multiple of baseline units and thus aligns to the baselines even if the number of baselines over the page is changed. In this way, the layout system 146 supports increased user and computational efficiency of the computing device 104.

Figure 26:
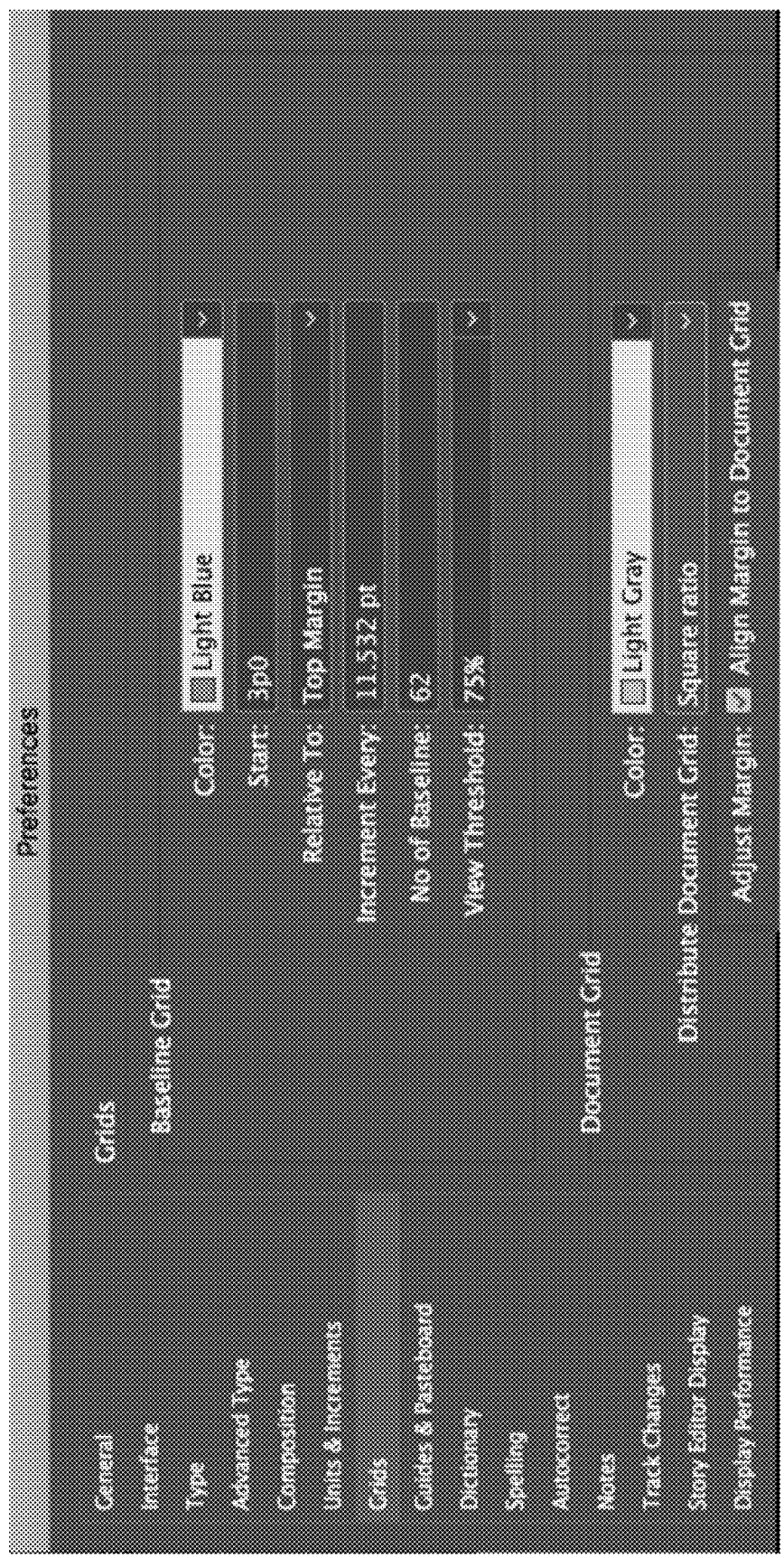
FIG. 26 depicts an example implementation of a user preference control by a layout system to automatically adjust margins to align with a document grid.

FIG. 26 depicts an example implementation 2600 of a user preference control by the layout system 146 to automatically adjust margins to align with a document grid. Use of this control causes margins of the page to overlap a nearest document grid line. Therefore, if the baseline grid is created from "top of the page" then each of the margins may be snapped to the document grid. If the baseline grid is created from "top of margin" then the left and right margins are snapped to the document grid.

In another example, top and bottom spacing of margins is defined using baseline units. For example, a page with a height of five hundred points and ten baselines constructed at a "start at" value of one hundred points has a distance between the baselines of forty points. If a margin inset is set to "0.2 baseline units," then the margins are drawn at eight points in the page. Accordingly, a change to a value of a baseline unit also causes a change to the margins.

FIG. 27 depicts an example implementation in which a document grid is adjusted automatically and without user intervention by the layout system 146 in response to changes in size of an available content display area of a page. Consider a page with a height and width of twenty centimeters. A corresponding document grid is set to have vertical and horizontal grid distance of two centimeters. If a document page height and width are then changed to 17 cm as shown for a first conventional example 2702, the document grid "spills outside" a page edge from both the bottom and right edges.

In the second example 2704 of the baseline unit techniques described herein, however, the document grid is automatically readjusted by the layout system 146 to automatically fit an available content display area. Continuing with the previous example, resizing of the document grid is shown such that the document grid box does not "spill out" from a bottom edge or side edge, but rather continues according to a user specified ratio. A variety of other examples are also contemplated without departing from the spirit and scope thereof.

Example System and Device

Figure 28:
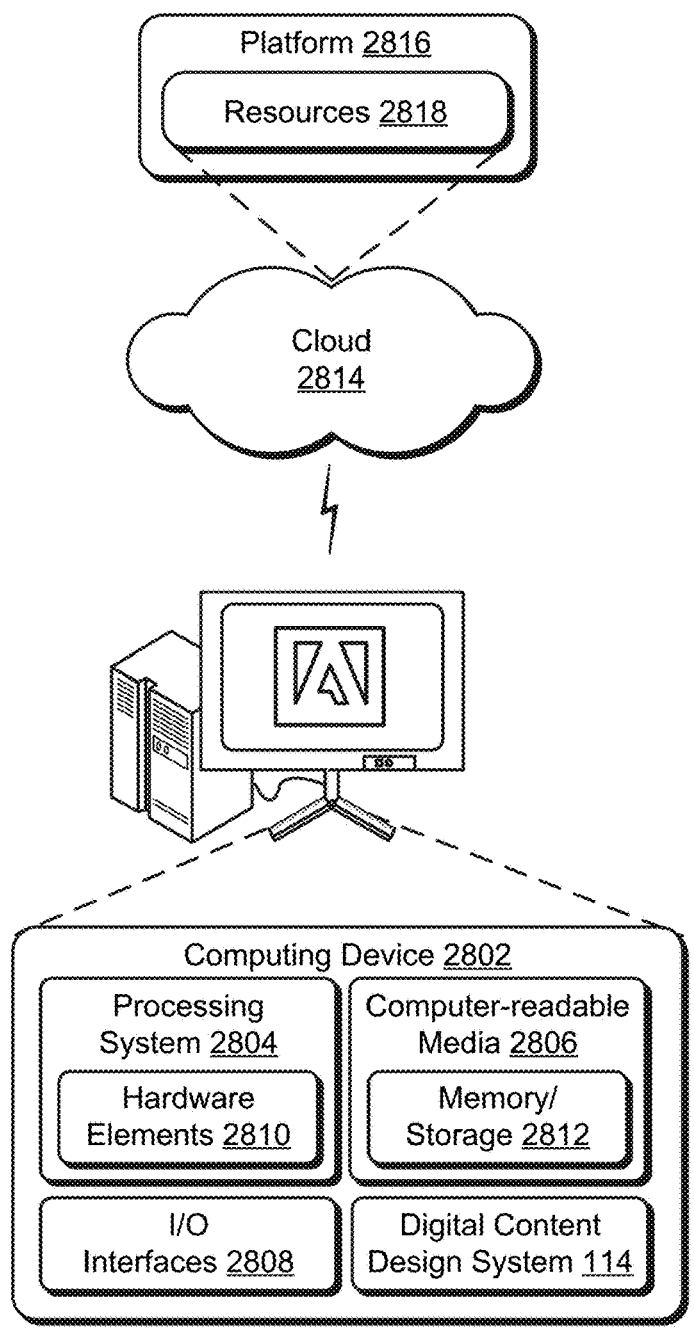
FIG. 28 illustrates an example system including various components of an example device that can be implemented as any type of computing device as described and/or utilize with reference to FIGS. 1-27 to implement embodiments of the techniques described herein.

FIG. 28 illustrates an example system generally at 2800 that includes an example computing device 2802 that is representative of one or more computing systems and/or devices that may implement the various techniques described herein. This is illustrated through inclusion of the digital content design system 114. The computing device 2802 may be, for example, a server of a service provider, a device associated with a client (e.g., a client device), an on-chip system, and/or any other suitable computing device or computing system.

The example computing device 2802 as illustrated includes a processing system 2804, one or more computer-readable media 2806, and one or more I/O interface 2808 that are communicatively coupled, one to another. Although not shown, the computing device 2802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 2804 is representative of functionality to perform one or more operations using hardware. Accordingly, the processing system 2804 is illustrated as including hardware element 2810 that may be configured as processors, functional blocks, and so forth. This may include implementation in hardware as an application specific integrated circuit or other logic device formed using one or more semiconductors. The hardware elements 2810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 2806 is illustrated as including memory/storage 2812. The memory/storage 2812 represents memory/storage capacity associated with one or more computer-readable media. The memory/storage component 2812 may include volatile media (such as random access memory (RAM)) and/or nonvolatile media (such as read only memory (ROM), Flash memory, optical disks, magnetic disks, and so forth). The memory/storage component 2812 may include fixed media (e.g., RAM, ROM, a fixed hard drive, and so on) as well as removable media (e.g., Flash memory, a removable hard drive, an optical disc, and so forth). The computer-readable media 2806 may be configured in a variety of other ways as further described below.

Input/output interface(s) 2808 are representative of functionality to allow a user to enter commands and information to computing device 2802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 2802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 2802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 2802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 2810 and computer-readable media 2806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 2810. The computing device 2802 may be configured to implement particular instructions and/or functions corresponding to the software and/or hardware modules. Accordingly, implementation of a module that is executable by the computing device 2802 as software may be achieved at least partially in hardware, e.g., through use of computer-readable storage media and/or hardware elements 2810 of the processing system 2804. The instructions and/or functions may be executable/operable by one or more articles of manufacture (for example, one or more computing devices 2802 and/or processing systems 2804) to implement techniques, modules, and examples described herein.

The techniques described herein may be supported by various configurations of the computing device 2802 and are not limited to the specific examples of the techniques described herein. This functionality may also be implemented all or in part through use of a distributed system, such as over a "cloud" 2814 via a platform 2816 as described below.

The cloud 2814 includes and/or is representative of a platform 2816 for resources 2818. The platform 2816 abstracts underlying functionality of hardware (e.g., servers) and software resources of the cloud 2814. The resources 2818 may include applications and/or data that can be utilized while computer processing is executed on servers that are remote from the computing device 2802. Resources 2818 can also include services provided over the Internet and/or through a subscriber network, such as a cellular or Wi-Fi network.

The platform 2816 may abstract resources and functions to connect the computing device 2802 with other computing devices. The platform 2816 may also serve to abstract scaling of resources to provide a corresponding level of scale to encountered demand for the resources 2818 that are implemented via the platform 2816. Accordingly, in an interconnected device embodiment, implementation of functionality described herein may be distributed throughout the system 2800. For example, the functionality may be implemented in part on the computing device 2802 as well as via the platform 2816 that abstracts the functionality of the cloud 2814.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital content design creation environment, a method implemented by at least one computing device, the method comprising:
 calculating, by the at least one computing device, a baseline unit as a unit of measure, the baseline unit defined as a distance used to space adjacent baselines of a number of baselines within a defined region for a page in a user interface;
 displaying, by the at least one computing device, an indication of a display characteristic and an option to set an amount of the display characteristic in the user interface, the option indicating in the user interface that the baseline unit is the unit of measure to set the amount;
 receiving, by the at least one computing device, a user input specifying the amount using the baseline unit as the unit of measure; and
 controlling, by the at least one computing device automatically and without user intervention responsive to the user input, the amount of the display characteristic for digital content in the user interface using the baseline unit as the unit of measure.

2. The method as described in claim 1, wherein the defined region is included within specified margins for the page or defined using a start at value.

3. The method as described in claim 1, wherein the number of baselines is distributed evenly, one to another, over the defined region along a defined axis in the user interface.

4. The method as described in claim 1, wherein the display characteristic is a font size of the digital content.

5. The method as described in claim 1, wherein the display characteristic is spacing before or after the digital content on a respective said baseline.

6. The method as described in claim 1, wherein the display characteristic is an amount of indent of the digital content.

7. The method as described in claim 1, wherein the display characteristic includes spacing of a document grid.

8. The method as described in claim 1, wherein the display characteristic includes spacing of a ruler guide.

9. The method as described in claim 1, wherein the display characteristic includes a margin of the page.

10. In a digital content design creation environment, a system comprising:
 a baseline generation module implemented at least partially in hardware of at least one computing device to generate a number of baselines based at least in part on an available display area for a page in a user interface;
 a baseline unit calculation module implemented at least partially in hardware of the at least one computing device to calculate a baseline unit as a unit of measure, the baseline unit specified as a distance defined by an amount of separation between two of the baselines generated for the page that are adjacent, one to another; and
 a content display control module implemented at least partially in hardware of the at least one computing device to display an option to set an amount of a display characteristic using the baseline unit as the unit of measure.

11. The system as described in claim 10, wherein the display characteristic is a font size of the digital content.

12. The system as described in claim 10, wherein the display characteristic is spacing before or after the digital content on a respective said baseline.

13. The system as described in claim 10, wherein the display characteristic is an amount of indent of the digital content.

14. The system as described in claim 10, wherein the display characteristic includes spacing of a document grid.

15. The system as described in claim 10, wherein the display characteristic includes spacing of a ruler guide.

16. The system as described in claim 10, wherein the display characteristic includes a margin that is disposed outside the available display area within the page.

17. In a digital content design creation environment, a system comprising:
 means for generating a number of baselines based at least in part on an available display area for a page in a user interface;
 means for calculating a baseline unit implemented at least partially in hardware of the at least one computing device to calculate a baseline unit based on a distance defined by an amount of separation between two of the baselines generated for the page that are adjacent, one to another;
 means for displaying an indication of a display characteristic and an option in a user interface, the option displayable as indicating that the baseline unit is set as the unit of measure to set an amount of the display characteristic responsive to a user input; and means for controlling the amount of a display characteristic of digital content within the page responsive to the user input in which the amount is set using the baseline unit as the unit of measure.

18. The system as described in claim 17, wherein the display characteristic is a font size of the digital content.

19. The system as described in claim 17, wherein the display characteristic is spacing before or after the digital content on a respective said baseline.

20. The system as described in claim 17, wherein the display characteristic is an amount of indent of the digital content.

\* \* \* \* \*